US009864963B2

United States Patent
Cronin et al.

(10) Patent No.: US 9,864,963 B2
(45) Date of Patent: *Jan. 9, 2018

(54) SYSTEM AND METHOD FOR PROVIDING CONTENT-BASED USER INTERFACE CARDS

(71) Applicant: General Electric Company, Schenectady, NY (US)

(72) Inventors: David Cronin, Oakland, CA (US); Gregory Petroff, Montre Sereno, CA (US)

(73) Assignee: General Electric Company, Schenectady, NY (US)

( * ) Notice: Subject to any disclaimer, the term of this patent is extended or adjusted under 35 U.S.C. 154(b) by 204 days.

This patent is subject to a terminal disclaimer.

(21) Appl. No.: 14/049,187

(22) Filed: Oct. 8, 2013

(65) Prior Publication Data

US 2015/0100893 A1 Apr. 9, 2015

(51) Int. Cl.
*G06Q 10/06* (2012.01)
*H04L 29/08* (2006.01)

(52) U.S. Cl.
CPC ....... *G06Q 10/06316* (2013.01); *H04L 67/22* (2013.01); *H04L 67/306* (2013.01)

(58) Field of Classification Search
CPC .. H04L 65/403; H04L 51/04; G06Q 10/06316
See application file for complete search history.

(56) References Cited

U.S. PATENT DOCUMENTS

| 6,167,441 | A | * | 12/2000 | Himmel | G06F 17/30905 707/999.104 |
|---|---|---|---|---|---|
| 6,453,353 | B1 | * | 9/2002 | Win | G06F 21/604 709/225 |
| 2003/0158796 | A1 | * | 8/2003 | Balent | G06Q 30/0633 705/28 |
| 2005/0111737 | A1 | * | 5/2005 | Das | G06T 11/60 382/190 |
| 2006/0294473 | A1 | * | 12/2006 | Keely | G06F 3/0483 715/776 |
| 2007/0179841 | A1 | * | 8/2007 | Agassi | G06Q 30/0255 705/14.53 |
| 2007/0208434 | A1 | * | 9/2007 | Yeh | G05B 23/0264 700/9 |
| 2011/0184790 | A1 | * | 7/2011 | Deol Brar | G06Q 30/0241 705/14.4 |

(Continued)

OTHER PUBLICATIONS

U.S. Appl. No. 61/762,745, filed Feb. 8, 2013.*
U.S. Appl. No. 61/762,749, filed Feb. 8, 2013.*

*Primary Examiner* — Ryan Barrett
*Assistant Examiner* — FJ Farhadian
(74) *Attorney, Agent, or Firm* — GE Global Patent Operation

(57) ABSTRACT

A system and method for providing context-based user interface cards is disclosed. According to one embodiment, a computer-implemented method comprises determining a user's context and a user's device. A plurality of user interface cards to the user's device is provided based on the user's context. Each of the plurality of user interface cards has a data portion and a form portion, and the data portion and the form portion of each of the plurality of user interface cards are delivered separately to the user's device.

18 Claims, 28 Drawing Sheets

(56) References Cited

U.S. PATENT DOCUMENTS

| | | | |
|---|---|---|---|
| 2013/0159097 A1* | 6/2013 | Schory | G06Q 30/0261 |
| | | | 705/14.49 |
| 2014/0229425 A1* | 8/2014 | Lo | G06F 17/30528 |
| | | | 707/602 |
| 2014/0336920 A1* | 11/2014 | Burrell | G01C 21/206 |
| | | | 701/409 |
| 2015/0100892 A1* | 4/2015 | Cronin | G06Q 10/00 |
| | | | 715/747 |
| 2015/0100893 A1* | 4/2015 | Cronin | H04L 65/403 |
| | | | 715/751 |

* cited by examiner

| Patients | | | | | 601 →⚲  602 →🫀  603 →▥  604 →◉  605 →📶  606 →🕐  607 →● |
|---|---|---|---|---|---|
| NAME ▼ | MRN | DOB | PCP | ROOM | |
| Van DerHoote, Doris | 009 18 721 | 6/12/47 | J. Fraserton | 1207 | |
| Nascimento, Milton | 010 87 654 | 3/22/74 | M. Smith | 1208 | |
| Evans, William | 007 64 991 | 11/19/31 | B. Yanci | 812 | |
| Brown, Dennis | 008 98 657 | 7/26/38 | J. Ling | 832 | |

Alerts

[ 🔍 ] [ Filter ]

URGENT Excessive vibration
Sensor data show greater than expected vibration from 1:18 onwards. This condition is newly detected on this flight, doesn't appear to represent trend of deterioration.
12/02/13 11:08
Engineering and Maintenance notified, diagnostics underway
12/02/13 11:24

MODERATE Debris detected in turbofan
Debris consistent with several impacts to fan blades detected during climb at approx. 10k feet. No immediate impact to thrust.

Figure 10

| Engine #1 | ESN126407 | CFM56-5C4 | N286WN | SFO |
|---|---|---|---|---|
| MACHINE NAME | MACHINE ID | MODEL | TAIL NUMBER | LOCATION |

MACHINE APPS

Maintenance Repair & Modification History 1.5
CURRENT

Maintenance Planning Agent 1.10
CURRENT

Aircraft Health & Diagnostics 2.10
3.1 UPDATE AVAILABLE   What's New >

Fault Prevention Prognostics 1.27
CURRENT

Cloud Quick Access Data Recorder 2.6
2.7 UPDATE AVAILABLE   What's New >

| Engine Model Number | CFM56-5C4 |
|---|---|
| Engine Serial Number | 913-208 |
| Manufacture Date | 22 Feb 2002 |
| Acceptance Date | 10 Mar 2002 |
| Production Number | ST10420985 |
| Thrust rating | 34,000 lbf |

☆ Add to favorites

Machine card center

Update all

SERIAL PLATE    1/12

Figure 11

Engine #1
MACHINE NAME

ESN126407
MACHINE ID

CFM56-5C4
MODEL

N286WN
TAIL NUMBER

SFO
LOCATION

Alerts

URGENT  Excessive vibration
Sensor data show greater than expected vibration from 1:18 onwards. This condition is newly detected on this flight, doesn't appear to represent trend of deterioration.
12/02/13 11:08

Engineering and Maintenance notified, diagnostics underway
12/02/13 11:24

---

MODERATE  Debris detected in turbofan
Debris consistent with several impacts to fan blades detected during climb at approx. 10k feet. No immediate impact to thrust.
06/13/13/ 16:35

Consect adipiscing nullam at dui turpis fringilla eros morbi ac tellus sit amet consect.

ISSUE LOG    4/12

Figure 14

| Engine #1 | ESN126407 | CFM56-5C4 | N286WN | SFO |
|---|---|---|---|---|
| MACHINE NAME | MACHINE ID | MODEL | TAIL NUMBER | LOCATION |

Alarms

| | Subject | Alarm | Code | Time |
|---|---|---|---|---|
| △ | GT1 | PM1 GCV Out Of Position | L86GCV1A_ALM | Today, 12:11 PM |
| △ | GT1 | Startup Fuel Flow Excessive Trip | L2SFT_ALM | Today, 12:10 PM |
| △ | GT1 | DC Emergency Lube Oil Pump Motor | L49QE_ALM | Today, 12:06 PM |
| ⬡2 | GT1 | GMS Core Monitor Overtemperature | AT1DD1F_ALM | 5/10/12, 10:32 PM |
| ⬢3 | GT1 | BRG Metal Temp Gen | AT2DDIFF_ALM | 5/10/12, 9:01 PM |

ALARM LIST    10/12

Figure 20

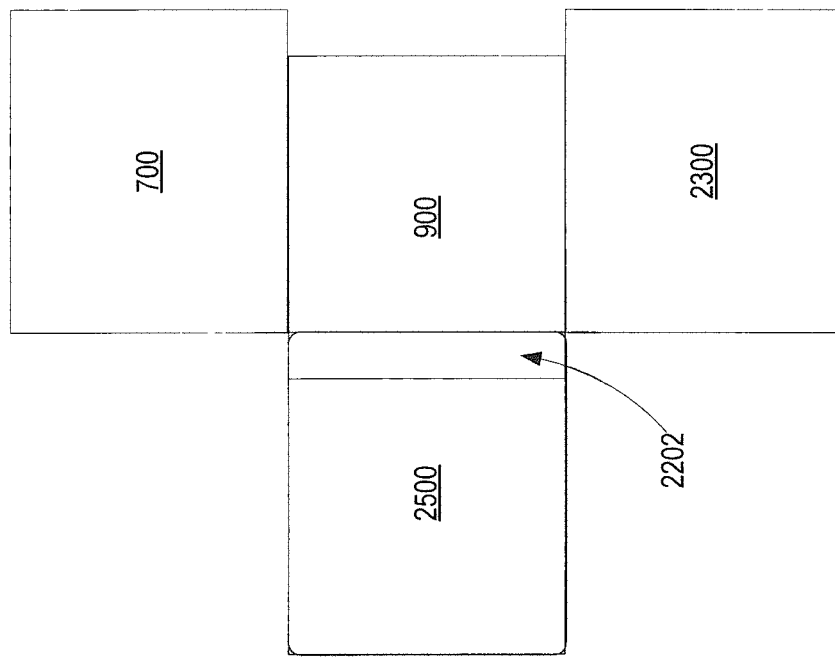
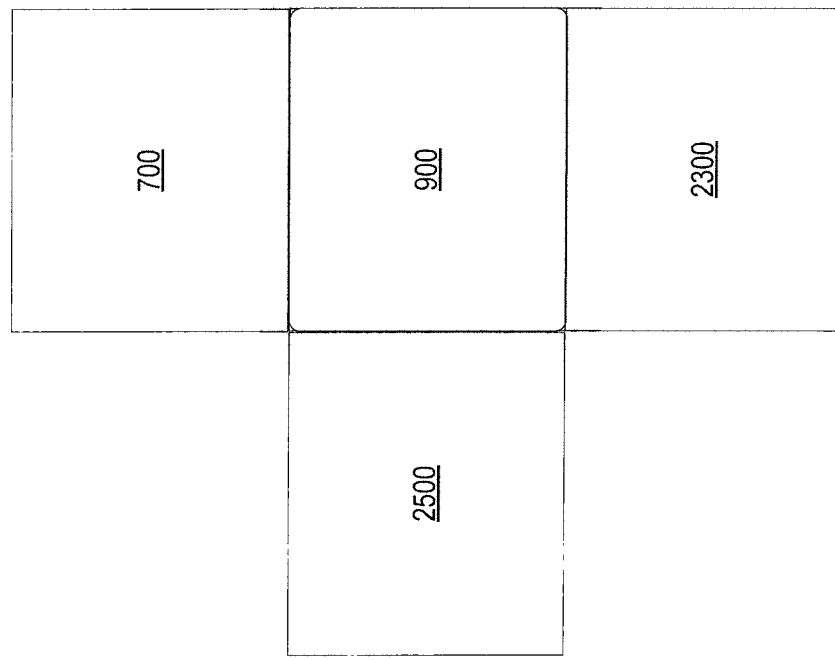
Figure 22

Colleagues

Bevington, Chris
Operations Agent
DEN Ops Center ○

Davis, Andres
Power Plant Engineer
LAX South Hanger ○

Dhankhar, Devyani
Dispatcher
DEN Ops Center ○

Ellington, Holden
Support Coordinator
SFO Gate 52 ◐

Hernandez, Benito
Maintenance Controller
SFO North Hanger ●

SYSTEM AND METHOD FOR PROVIDING CONTENT-BASED USER INTERFACE CARDS

FIELD

The present disclosure relates in general to the field of providing user experiences, in particular, to a system and method for providing context-based users experiences.

BACKGROUND

Enterprises strive to serve existing customers, expand business, improve information access, and provide richer user interactions while driving down the cost. Increasing demands for applications exploiting vast amounts of information and data available on the Internet and enterprise servers require an enterprise platform that is capable of handling sophisticated data generation, processing, communication, and presentation. New business opportunities based on cloud-access capabilities are raising customer expectations and require improvement for user interactions and user experiences. One of the key areas to deliver business value at the enterprise application level is to integrate collaboration capabilities into business and workflow processes, foster new ways of user interactions and experiences.

When multiple users collaborate on a project, different tasks are given to respective users based on their job roles and responsibilities. User experiences on an enterprise application must be adaptable to accommodate the support of multiple users of different job roles, simultaneously or through the workflow process, by providing distinct user interfaces based on their job roles. Resultantly, enterprise applications require frequent updates or plug-ins to provide streamlined support for workflow management and lifecycle management.

Inexperienced users or users who are new to their roles must familiarize themselves with the given user experiences on enterprise applications, requiring time and effort to learn new functions and features. Oftentimes, those users use different devices and tools that run on different hardware and platforms, therefore enterprise applications must support a wide variety of devices, tools, and hardware to allow the users to continue to work with the devices and tools that they are comfortable with. To expedite a user's learning, conventional knowledge-based models such as Q&A, FAQs, are commonly used. However, many enterprise applications have limited capability and scalability in expanding capability and user training to efficiently transfer and update system components based on expert knowledge. Real-time collaboration becomes difficult and inadequate among users of different roles and knowledge levels, particularly when they are collaborating with different types of machines at different places.

SUMMARY

A system and method for providing context-based user experiences is disclosed. According to one embodiment, a computer-implemented method comprises determining a user's context and a user's device. A plurality of user interface cards to the user's device is provided based on the user's context. Each of the plurality of user interface cards has a data portion and a form portion, and the data portion and the form portion of each of the plurality of user interface cards are delivered separately to the user's device.

The above and other features, including various novel details of implementation and combination of events, will now be more particularly described with reference to the accompanying figures and pointed out in the claims. It will be understood that the particular methods described herein are shown by way of illustration only and not as limitations. As will be understood by those skilled in the art, the principles and features described herein may be employed in various and numerous embodiments without departing from the scope of the invention.

BRIEF DESCRIPTION OF THE DRAWINGS

The accompanying figures, which are included as part of the present specification, illustrate the present embodiments of the systems and methods and together with the general description given above and the detailed description of the embodiments given below serve to explain and teach the principles of the present systems and methods.

FIG. 6 illustrates an exemplary patient browser, according to one embodiment;

FIG. 10 illustrates an exemplary alerts card, according to one embodiment;

FIG. 11 illustrates an exemplary serial plate card, according to one embodiment;

FIG. 14 illustrates an exemplary issue log card, according to one embodiment;

FIG. 20 illustrates an exemplary alarm list card, according to one embodiment;

FIG. 22 illustrates an example of invoking collaboration and workflow coordination from card user interfaces, according to one embodiment;

FIG. 25 illustrates a screenshot of an exemplary collaboration and workflow user interface, according to one embodiment;

Figure 1:
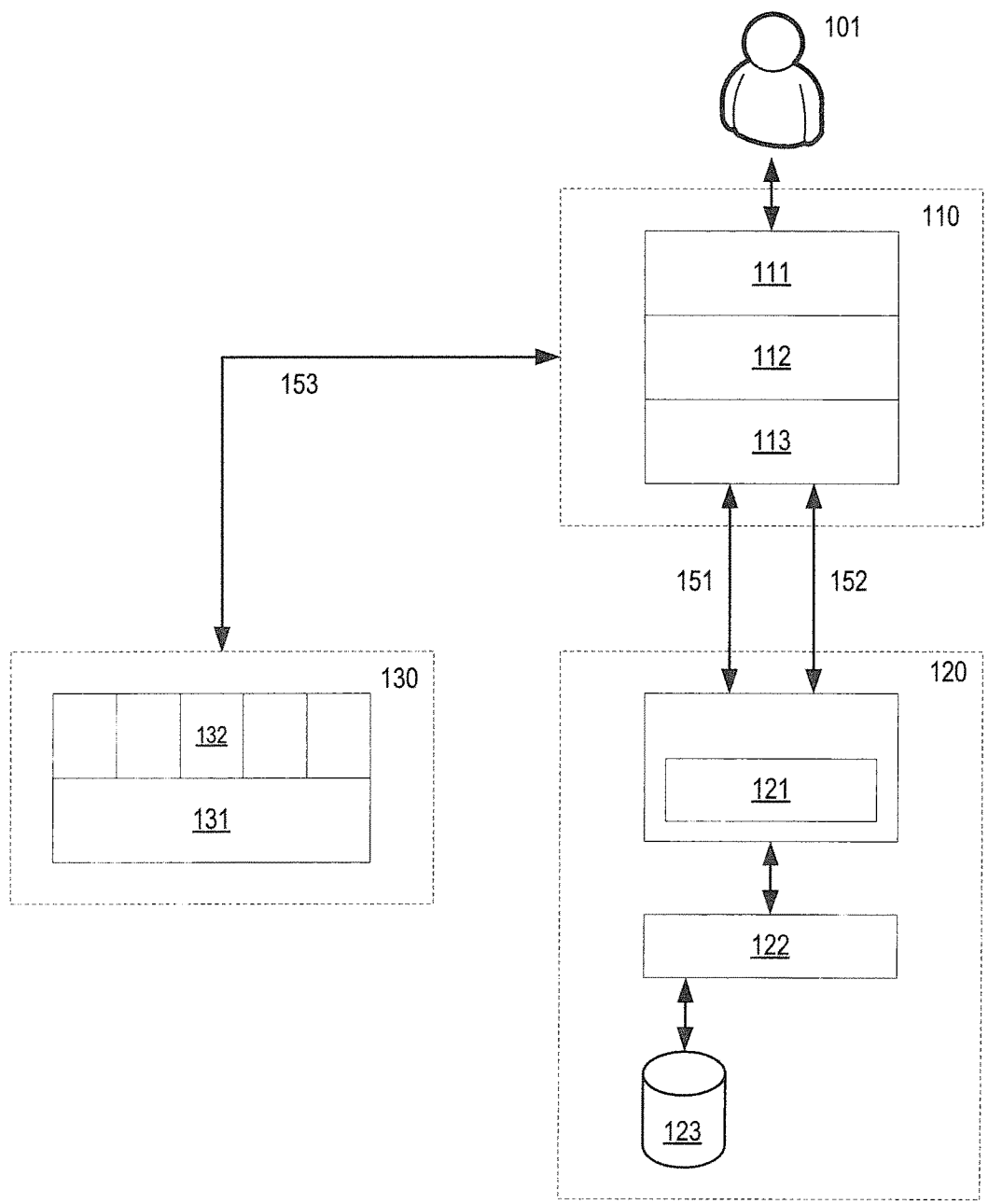
FIG. 1 illustrates a system architecture of an exemplary cards platform, according to one embodiment.

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

Each of the features and teachings disclosed herein can be utilized separately or in conjunction with other features and teachings to provide a system and method for providing context-based user experiences. Representative examples utilizing many of these additional features and teachings, both separately and in combination, are described in further detail with reference to the attached figures. This detailed description is merely intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The methods or algorithms presented herein are not inherently related to any particular computer or other apparatus. Various general purpose systems, computer servers, or personal computers may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

A system and method for providing context-based user experiences is disclosed. According to one embodiment, a computer-implemented method comprises determining a user's context and a user's device. A plurality of user interface cards to the user's device is provided based on the user's context. Each of the plurality of user interface cards has a data portion and a form portion, and the data portion and the form portion of each of the plurality of user interface cards are delivered separately to the user's device.

A technical effect of the present system and method provides a user experience framework centered around a collection of playlists, herein referred to as cards. A series of simple and concise views of cards is presented via a card reader on the user's device. The cards provide useful information and control capabilities to users who interact with assets. Examples of assets include, but are not limited to, machines and patients that are being monitored, maintained, configured, and controlled by users. The present cards framework provides a user interface to interact with assets and information to work around the assets. Depending on a target application, it is understood that various types of assets may be exchangeably used in the following examples and principles without deviating from the scope of the present subject matter. Different assets (e.g., machines, equipment, sensors, patients) may be used depending on a target industry such as healthcare, energy, aviation, transportation, industrial Internet.

According to one embodiments, industry-specific cards are provided. For example, industrial cards include real-time and aggregated sensor data, diagnostics and prognostics, decision support and repair instructions for industrial machines and equipment. In another example, healthcare cards include patient monitoring, imaging, procedure checklists and aggregated clinical data such as lab reports.

The present cards framework provides a flexible card authoring and management environment and enables users to create and edit their own collection of cards and to subscribe to new cards created by an enterprise and third parties.

According to one embodiment, cards are presented in a card collection to assist users with specific activities and situations. By decomposing software user interface into cards and collections, the present cards framework enables users and organizations to combine cards in a way that is useful to their specific needs and workflows. In a typical scenario, users interact with several cards in a sequence to accomplish a particular goal, perform a task, or collaborate with other users.

The present cards framework is aware of a user's context such as user's location, role and responsibilities, situation, and/or environment. The present cards framework is further instrumented with analytics to perform specific tasks depending on the user's context. Based on the user's context and the analytics capability, the present cards framework suggests cards that are useful to a user based upon this context and provides a user experience platform that delivers the right information to the right user, at the right time, helping the user to understand a situation, make a decision, and perform an appropriate action.

By providing ease of access to information, the present cards framework provides user interfaces that facilitate intuitive, effective and efficient interaction with assets. Information that was formerly laborious to reach is easier to obtain, and analytics capabilities based on the obtained information support a faster and better decision-making based on the user's context.

According to one embodiment, cards can be delivered to any type of display and mobile devices such as smartphones, a mobile device (e.g., iPad, Kindle), a laptop, a big screen, a desktop PC, a wearable computer, and an industrial machine. The present cards framework provides a seamless user experience as users move across these devices in hospitals, power plants, drilling platforms, offices or any other places where an enterprise supports users.

According to one embodiment, the present cards framework provides various user input methods to interact with equipment and machines such as gestural control, computer vision and machine learning to provide natural interactions for users in challenging industrial and medical situations, and improve the user's ability get information at a point of their need.

According to one embodiment, the cards are created using HTML5 and JavaScript. These cards are constructed and deployed independently of the application utilizing the cards using the Industrial Internet Design System (IIDS) and HTTP Dynamic Streaming (HDS), a set of UI widgets and templates created to meet the user experience required by the industry. The present cards framework facilitates construction, customization, deployment, updates and lifecycle management of software.

The present cards framework reduces development time and cost, allowing businesses to more quickly create and improve software tools to complement their existing product and services offerings. The reduction of development time improves the responsiveness to customer and market needs by easily creating and deploying highly targeted capabilities for specific situations. Analytics helps the service providing enterprise to deliver services that improve customers' businesses, for example, providing prognostics for preventing the failure of expensive equipment and preventing hospital-acquired infection.

According to one embodiment, cards bring together information sources and control capabilities from machines as well as from cloud-based and enterprise systems. The card reader connects to a card server and is capable of directly connecting to distributed machines via a machine interface if the distributed machines are network ready. Such directly connected machines have a network interface to connect to the card reader or are connected to the card reader via a router or other machines that have a network capability. Depending on the specific implementation, the card server provides a range of platform capabilities. Examples of such platform capabilities include, but are not limited to, user authentication, provisioning, entitlement management, card repository, data access services, workflow orchestration, collaboration capabilities (e.g., contacts, video chat, messaging,), analytics, asset management (e.g. graph database or registry), patient registry, and integration and mash-up of data from various enterprise sources.

FIG. 1 illustrates a system architecture of an exemplary cards framework, according to one embodiment. The card reader 110 provides user interfaces to user 101. The card reader 110 has a collection of cards 111, a phonegap 112, and a custom code 113. Cards 111 provide styled layouts for JQuery, JavaScript, and IIDS. The phonegap 112 provides HTML rendering and JavaScript to iOS bridge. The custom code 113 provides a core reader user interface, custom controls, hardware access, offline data caching, and network access. The card reader 110 connects with an enterprise server 120 via various communication protocols. For example, the enterprise server 120 sends HTML-based cards 111 to the card reader 110 via HTTP 151 and JSON data via WebSockets 152. The enterprise server 120 has a visualization stack 121 and a core 122 that connects to a database 123. The card reader 110 is also capable of connecting to a machine 130 via various communication protocol 153 (e.g., REST/JSON/HTTP). The machine 130 has a micro-kernel 131 and runs an application 132.

Figure 2:
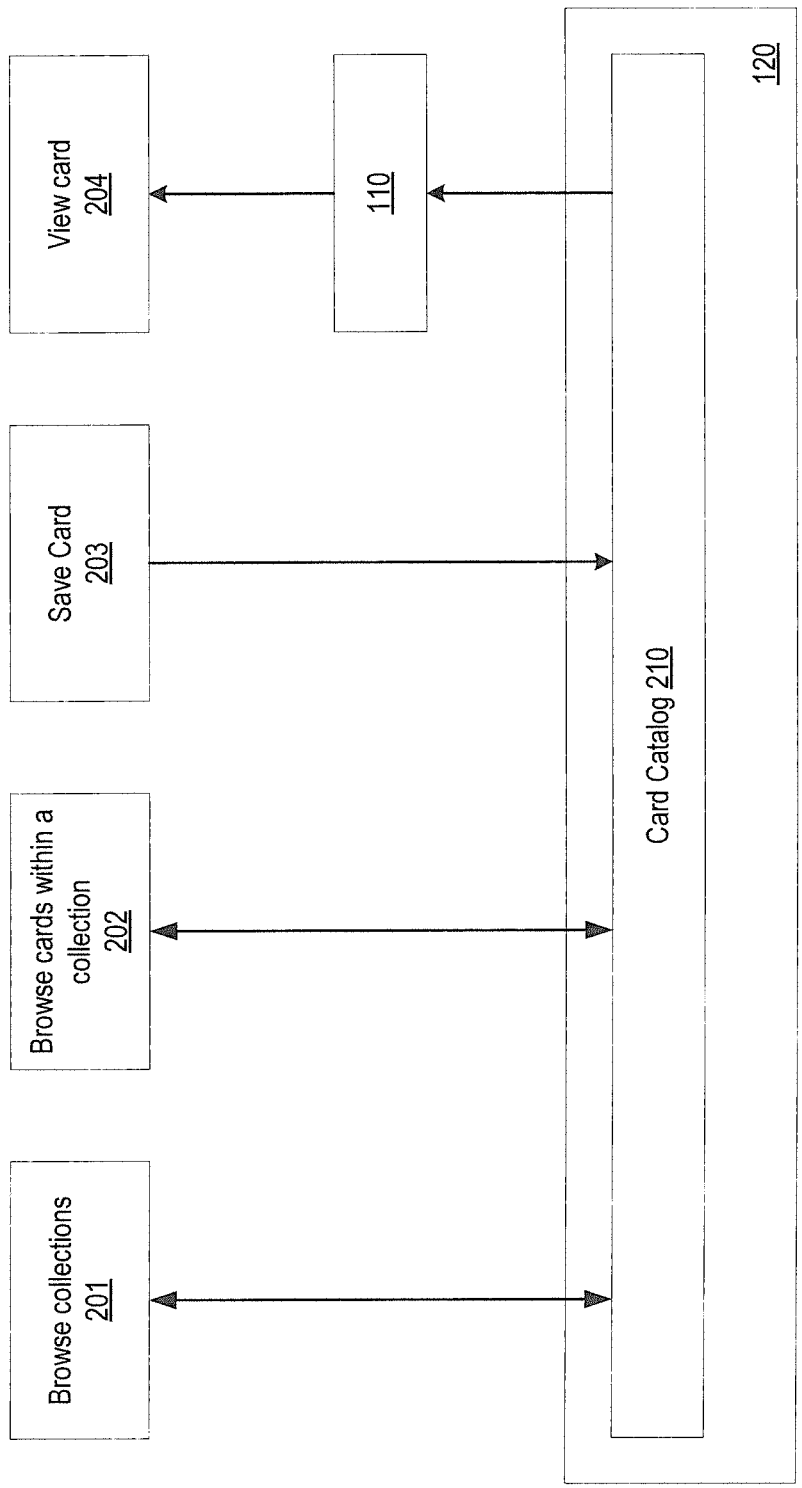
FIG. 2 illustrates exemplary processes of card selection and viewing, according to one embodiment.

FIG. 2 illustrates exemplary processes of card selection and viewing, according to one embodiment. Based on the user's context, the user 101 retrieves a list of card collections (201) from a card catalog 210 on the enterprise server 120. The list of available card collections is provided by filtering the user's context such as permission, location, favorites, category, and card types. The user 101 selects a card collection, and the enterprise server 120 provides a list of available cards based on the user's selection. The user 101 browses cards within the selected collection (202). The user 101 selects cards from the list of available cards and saves the selected cards (203). The selected cards are saved to the user's device and become available by the card reader 110. The loaded cards are viewed to the user 101 (204) along with refreshed data (or cached data if fresh data is not available)

that is separately injected into the card from the enterprise server 120. The data requested by the card reader 110 may be available on a database of the enterprise server 120, a cloud, a third party server, or the Internet.

Industrial Internet Usage Scenario

Mobile field services personnel such as maintenance engineers perform routine maintenance and unplanned repairs on a wide range of machines (e.g. power plants, MRI machines, wind turbines)

Figure 3:
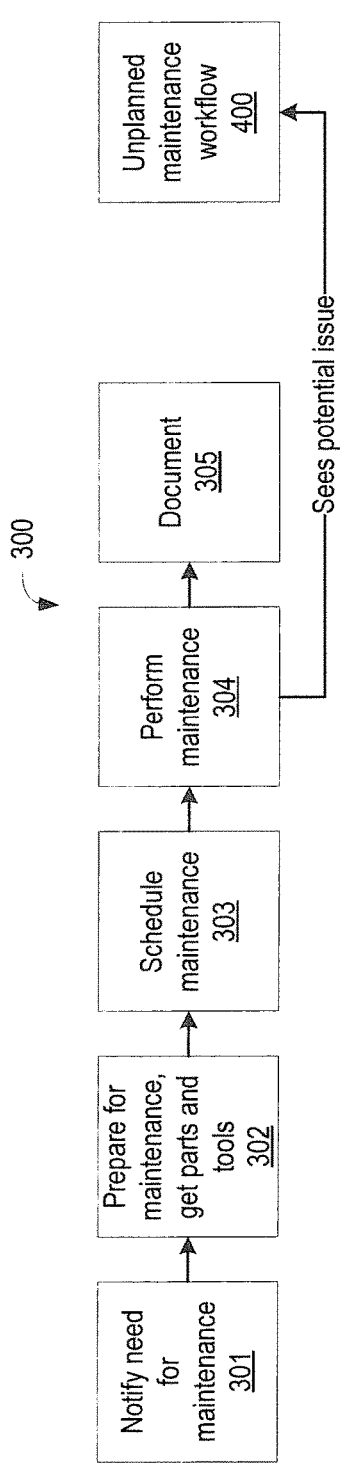
FIG. 3 illustrates an exemplary planned maintenance workflow, according to one embodiment.

FIG. 3 illustrates an exemplary planned maintenance workflow, according to one embodiment. Upcoming need for maintenance is notified to an appropriate user (301). The notified user prepares for the maintenance, for example, getting parts and tools (302), and schedules the maintenance (303). The user performs the maintenance (304), and creates a report for maintenance documentation (305). If the user identifies a potential issue while performing the maintenance, the user performs the unplanned maintenance flow (306).

Figure 4:
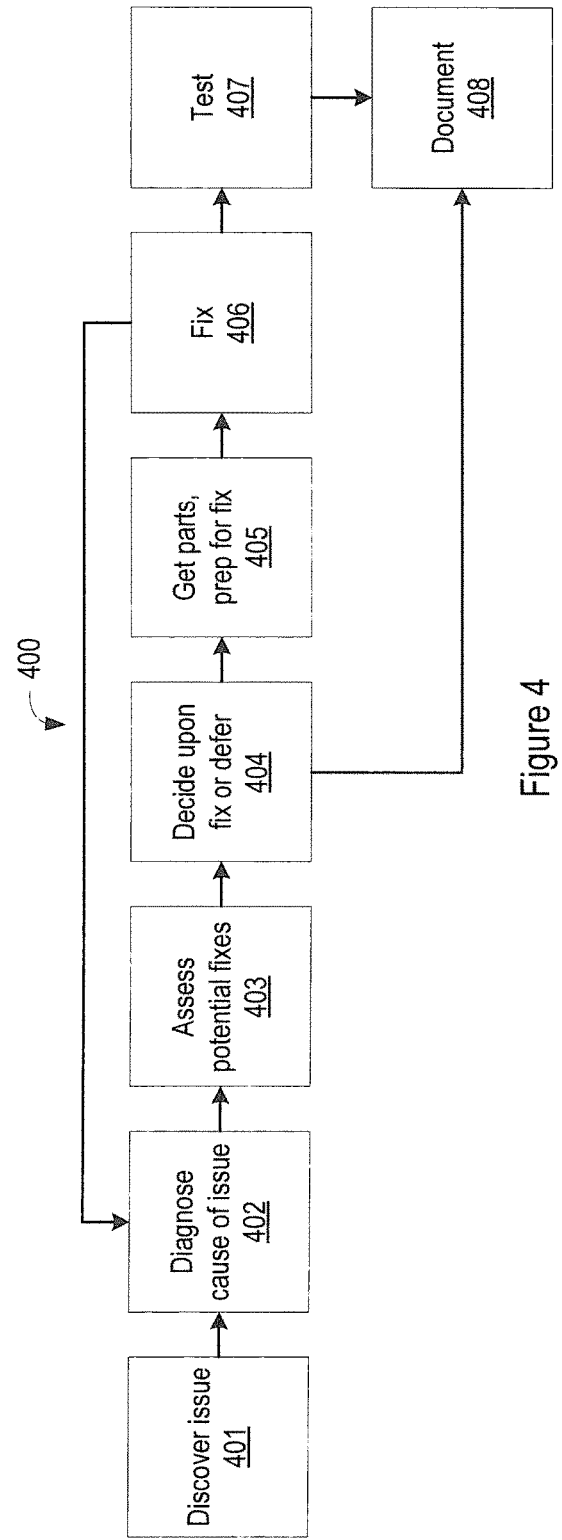
FIG. 4 illustrates an exemplary unplanned maintenance workflow, according to one embodiment.

FIG. 4 illustrates an exemplary unplanned maintenance workflow, according to one embodiment. An issue is discovered by sensors or a human (401). The cause of the issue is diagnosed (402) and potential fixes for the issue are assessed (403). The diagnosis and assessment of the fixes may be performed by running an analytics or an experienced expert. A decision is made whether to fix or defer the issue (404). When it is decided to defer the issue, a user prepares maintenance documentation accordingly (408). When it is decided to fix the issue, a user gets parts and prepares for the fix (405) and performs the fix (406). After the issue is fixed, a diagnostics may be run to confirm the fix or the issue persists after the fix. A test is run (407), and the user prepares maintenance documentation (408).

A basic field force enablement is primarily driven by a cloud-based server-based functionality instead of data received directly from machines. Advanced field force enablement capabilities include monitoring, diagnostics and control of machines. Generally, basic usage scenarios do not require real-time monitoring or control capabilities.

Core capabilities of field force enablement that support user's needs in the field include:
  work ticketing (through the tasks capability in the collaboration and workflow)
  issue alerting (through alerts in the collaboration the workflow)
  machine location (through the machine browser and cards)
  work scheduling (cards)
  work instructions, maintenance manuals-text-based or multi-media (cards)
  maintenance history (cards)
  service bulletins, e.g. known issues for a given machine (cards)
  troubleshooting guides (cards)
  communication with other field services personnel including peers and experts (through collaboration capability in collaboration and workflow)
  parts inventory status and ordering (cards)
  maintenance documentation (cards)
  access to screens from existing enterprise applications (cards)

According to one embodiment, the present system and method provides monitoring capability of machines. For example, field services personnel, asset managers and business people monitor the performance of machines, fleets and sites.

Monitoring of machines is based on data that comes from sensors on machines, analytics results on the sensor data, data from enterprise systems (e.g. for financial performance of a machine) and other data sources (e.g. weather data). The sensor data may be delivered to the card reader from a programmable logic controller (PLC) of a distributed machine from an on-premise or a cloud server that aggregates data from multiple machines.

The frequency of monitoring may depend on the need for real-time data. For example, data may be refreshed every minute, multiple times a second, or on an as-needed basis.

Core capabilities that support user needs in this use case include:
  detailed (individual sensor-level) and aggregated data about individual machines, fleets and sites, presented in numerical, tabular and graphical formats (cards):
  presentation of analytic results, e.g., predictive asset management:
  user- and organization-defined alerts e.g., when a data element passes a set threshold (alerts in collaboration and workflow): and
  machine error/alarm history (cards).

The present system and method provide capabilities of machine configuration and control for field services personnel and operators (e.g. power plant operators). Users monitor and provide feedback about results of control and configuration actions, as well as identify the need for changes. Configuration changes may not require real-time systems but require some level of real-time updates (e.g., 1 Hz).

Core capabilities of machine configuration and control include:
  animated schematic visualization of machines, systems and corresponding current state data (e.g., SCADA human-machine interface (HMI)):
  ability to change the configuration of a single machine, subsystem, or a number of machines or subsystems in a site or fleet: and
  ability to actuate control over a machine (e.g. turn a pump on or off)

According to one embodiment, the present system and method provide an advanced field force enablement implementing a more holistic set of capabilities for field services personnel in addition to the basic field force enablement, monitoring and configuration and control needs described above. In one embodiment, the advanced field service suggests cards to users based upon the user's task and context.

According to one embodiment, the present cards platform is used to provide healthcare information of patients. The card reader aggregates healthcare information and views the aggregated information from disparate clinical information (e.g., EMRs) and hospital operations systems. The aggregated information is refreshed as needed but may not be real-time data. This information is useful to clinicians in a wide variety of situations, such as for a physician such as a hospitalist or intensivist conducting rounds in a hospital.

As with the patient information aggregation, the card reader provides real-time delivery and textual and graphical representation of patient data (e.g., ECG or perinatal) in real-time and even changes settings on medical devices. Health care providers such as nurses and anesthesiologists are provided with cards through their mobile devices and at a central station. This way, the amount of information that is delivered at a patient's bedside is reduced, thus providing a more peaceful and less scary environment for patients.

According to one embodiment, the present cards platform delivers software as media. In a manner similar to a media delivery platform (e.g., Apple's iTunes, Amazon's Your Media Library), the card reader connects to a card server to download and update software as media. Cards are equivalent to the media content (e.g., songs, movie), and the collection of cards are equivalent to albums. Delivering software as media makes it easy to create, distribute, share, combine, and remix useful expressions of machine or patient information, configuration and control of machines. The present cards platform also enables users to compile a user experience that meets their specific needs and collect cards from a variety of sources.

According to one embodiment, the present cards platform helps businesses to create their own applications and solve repeating problems while providing security, workflow, collaboration tools. The card reader functions as a core infrastructure to enable businesses, customers and third parties to create and share content.

According to one embodiment, the present cards platform provides content that is appropriate to a user's context. By understanding a user's context such as location, roles and responsibility, and correlating the user's context with situational facts (e.g., environmental data, market conditions), the present cards platform delivers the right information to the right person at the right time. For example, the present card reader uses a geo-location to set the machine context and creates a card collection around a user's specific situational need. In one embodiment, a user's context suggests cards that are likely to be useful in a given situation based upon the analysis of similar situations.

According to one embodiment, cards are created around the Industrial Internet Design System (IIDS). The IIDS is an extensible set of design and development framework that supports easy creation of Industrial Internet software applications. The industrial Internet integrates complex machines, ingests data from the integrated machines and other resources, analyzes data (often in real-time), and uses the results of analysis to adjust machine operations and machine learning. The industrial Internet also harnesses cloud-based services and brand principles to generate a consistent and compliant look and feel of software applications.

A set of common card components provides a number of benefits including, but not limited to:
  composibility and modularity of design patterns to reuse and rapidly construct software applications:
  forward-compatibility, where updating the component library (e.g., IIDS) (or CSS) updates the user interface of cards with minimal additional effort:
  enablement of a connected division of labor according to contemporary web development methodologies: and
  aid in the accelerated creation of quality end products, as well as ongoing evolution of concepts.

According to one embodiment, the present card reader provides a collection of cards based on a spatial interaction model. In an industrial or healthcare application, the card reader provides user interfaces for 1) a machine and patient browser, 2) a card viewer, 3) a card organizer, and 4) collaboration and workflow coordination tool. The spatial interaction model provides animated transitions to expose and reflect the underlying organization of these user interfaces. The visual style of the user interfaces establishes a brand character.

The machine and patient browser allows users to quickly identify and connect to information about machines and patients in a plant, hospital, fleet, or enterprise. In one embodiment, the machine and patient browser includes favorites, a hierarchy browser, map-based asset identification, and near field communication (NFC). The card viewer provides easy-to-create presentations of information for a selected machine (or patient) including various card controls, and reorders them to support a workflow. The card organizer provides users with an ability to organize cards into different collections to support a workflow. The card organizer also provides users with an ability to download new cards and collections from a card repository. The collaboration and workflow coordination provides users with various communication tools including text chat, video and voice calling, and image annotation and sharing, as well as task and alert notification and tracking.

According to one embodiment, the present cards platform provides a visual style for establishing a brand character. The visual style reinforces the spatial interaction model by creating a space for information to flow through. The background graphic creates visual landmarks for different areas and buttons. By decoupling content and forms, users can pay more attention to the data visualization and user interfaces of the cards displayed on the card reader.

Machine and Patient Browser

According to one embodiment, the machine and patient browser contains a set of tools that allows users to select the machine or patient they need information about. The machine and patient browser is accessible from other user interfaces. For example, the machine and patient browser is accessed from the card viewer by touching the header bar or a swipe down motion from the top of the screen. The machine and patient browser sets context for the cards and enables a user to select a machine or patient for browsing information.

The machine generically refers to a electro-mechanical system that a person needs information about and control of at any level of aggregation. Examples of machines include, but are not limited to, a power plant, a gas turbine, a fleet of gas turbines, an airframe, a jet engine, an MRI machine, a hospital and so forth. The present cards platform implements hierarchical information about a machine model or ontology including the detailed description and status of machines and relationships between machines at different levels of aggregation.

Similar to the industrial machines, a patient refers to an individual in a healthcare application. The present cards platform enables healthcare providers and professionals to view cards that provide an individual patient's information or aggregated information of a group of patients, for example, all the patients in a unit, hospital or cohort, or all of a doctor's patients who have type-1 diabetes.

According to one embodiment, the context is set by the card itself. As described above, the context can also be set by the machine and patient browser. Cards may be fixed to a single, specific machine or patient context. In the collaboration and workflow environment, cards may display a collaborative task or a text message containing a link to a specific machine or patient.

According to one embodiment, the machine and patient browser contains a machine graph. The machine graph (also referred to as an asset graph) is the logical representation of the relationships between machines, their parts/subsystems and systems that they are contained in. The machine graph defines the behavior of the machine and patient browser and provides different user interfaces based on the asset types and implementations and visualization of data. For example, a machine graph for aircraft is different from a machine graph for power plants.

According to one embodiment, a machine graph displays and visualizes various machine or patient information. Examples of such machine and patient information include, but are not limited to, a unique identifier for a machine (e.g. serial number), a machine type (e.g. model number), synonyms for the machine (e.g., alias such as "Gas Turbine 1") and machine type (e.g., model name), relationships between machines and system (e.g., the Gas Turbine 1 is part of power plant A), and the list of machines that are addressable by the card reader and their data. Some machines in the graph may be created simply for the purpose of organization.

Figure 5:
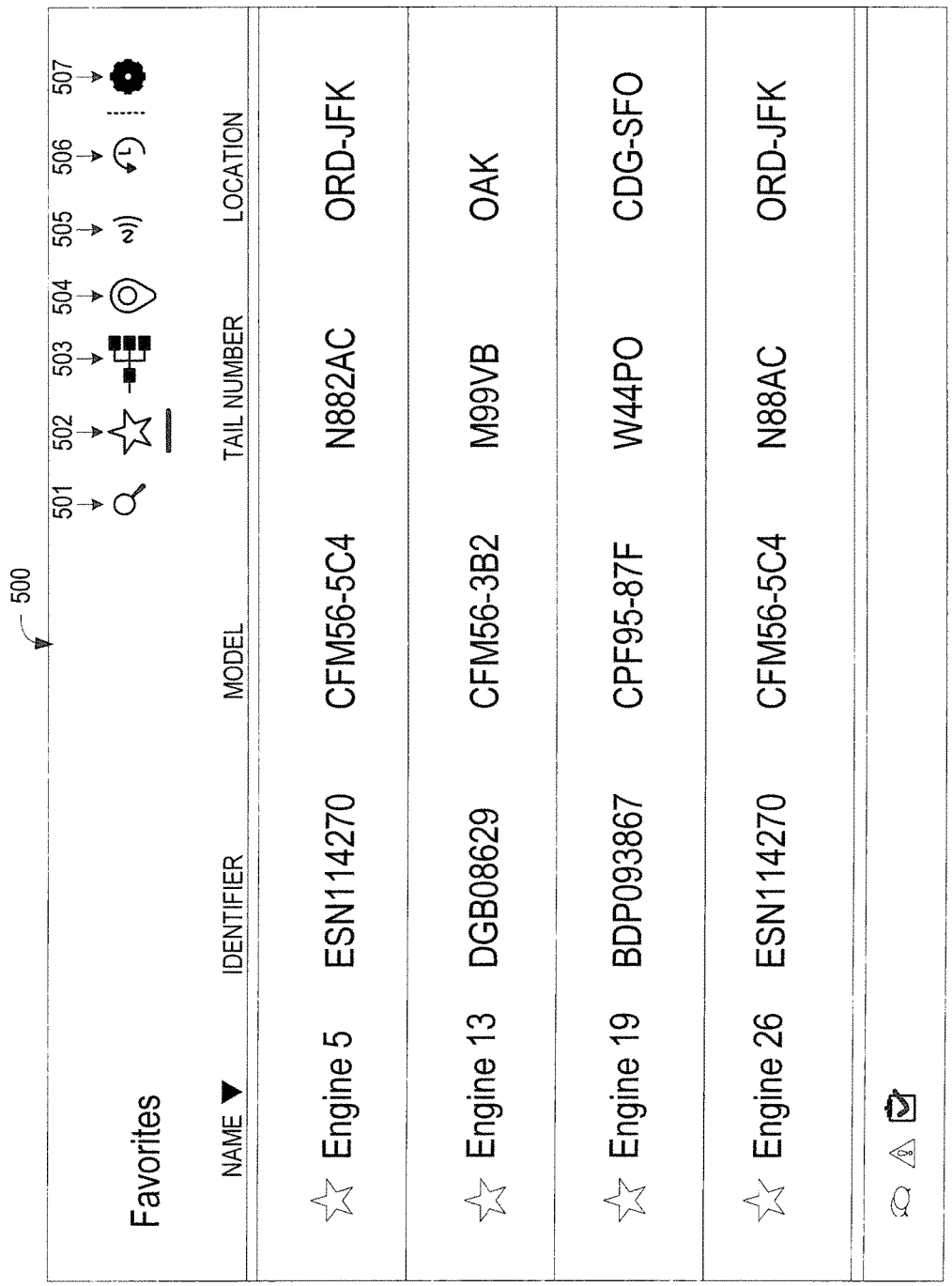
FIG. 5 illustrates an example of favorites of an exemplary machine browser, according to one embodiment.

FIG. 5 illustrates an example of favorites of an exemplary machine browser, according to one embodiment. The machine and patient browser identifies a machine or a group of machines of interest at a given time, and further provides features such as search 501, user-defined favorites 502, a hierarchy browser 503, geo-location 504, near-field communication 505, machine browser history 506, and settings 507. These features are accessed through icons in the upper right corner of the machine browser 500.

Those features that are not enabled or unused are hidden from the user. For example, when a geo-location data is not be available, the geo-location tab 504 is hidden on the machine browser. The base set of browser modes that are always presented are search 501, user-defined favorites 502 and the hierarchy browsers 503.

FIG. 6 illustrates an exemplary patient browser, according to one embodiment. When the card reader is used in a healthcare application, the favorites tab is replaced with a patient tab 1202, which shows the list of patients that a clinician is assigned to or who have been marked as favorites. Similar to the machine browser 500, the patient browser 600 has tabs for search 601, patients 602, a hierarchy browser 603, geo-location 604, near-field communication 605, machine browser history 606, and settings 607.

Figure 7:
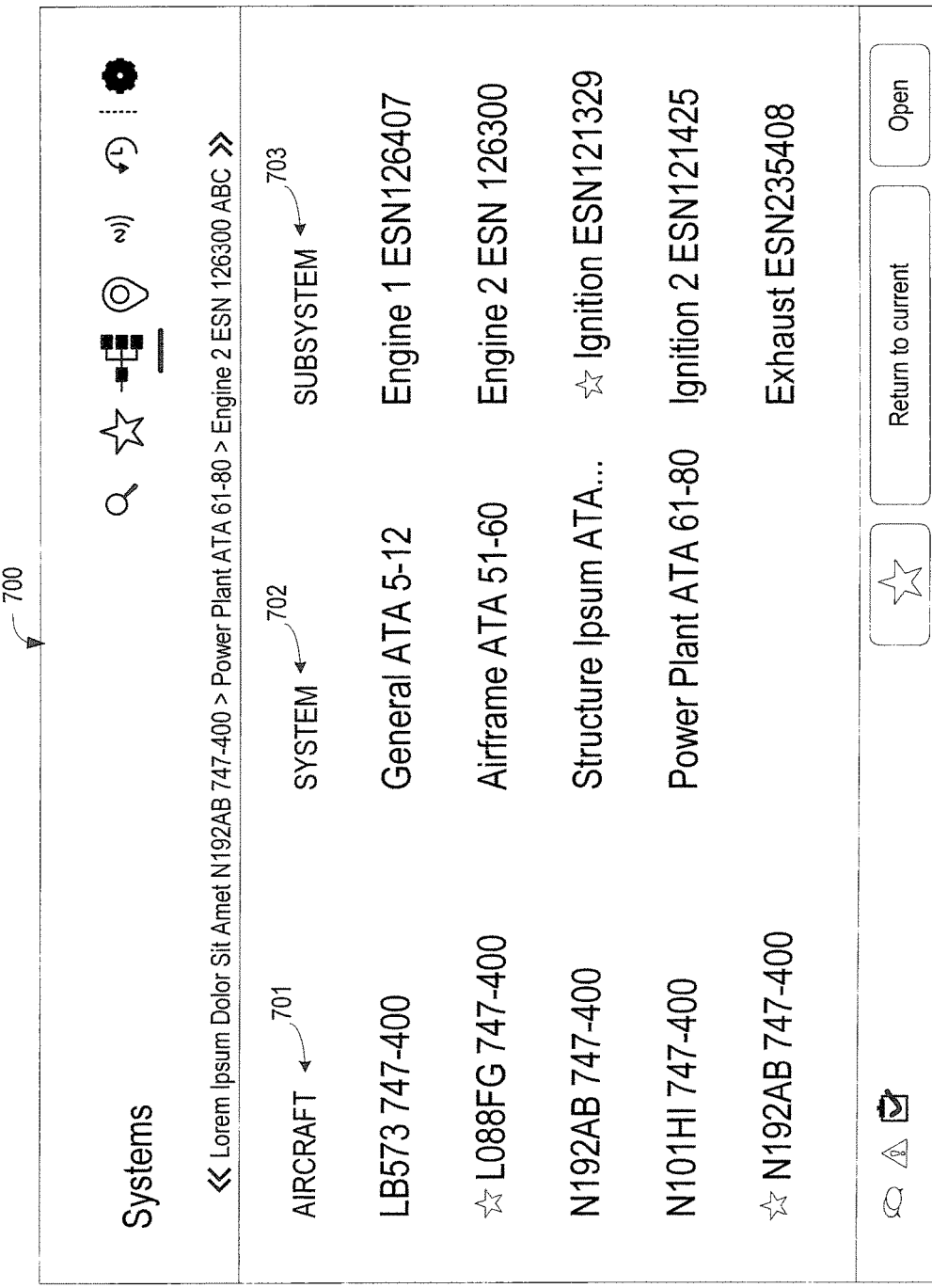
FIG. 7 illustrates an exemplary system hierarchy browser, according to one embodiment.

FIG. 7 illustrates an exemplary system hierarchy browser, according to one embodiment. From the machine browser 500, the hierarchy browser tab 503 is selected, and the information about aircrafts 701, the list of available systems 702 of the selected aircraft, and the subsystems 703 are displayed in an hierarchical manner.

Figure 8:
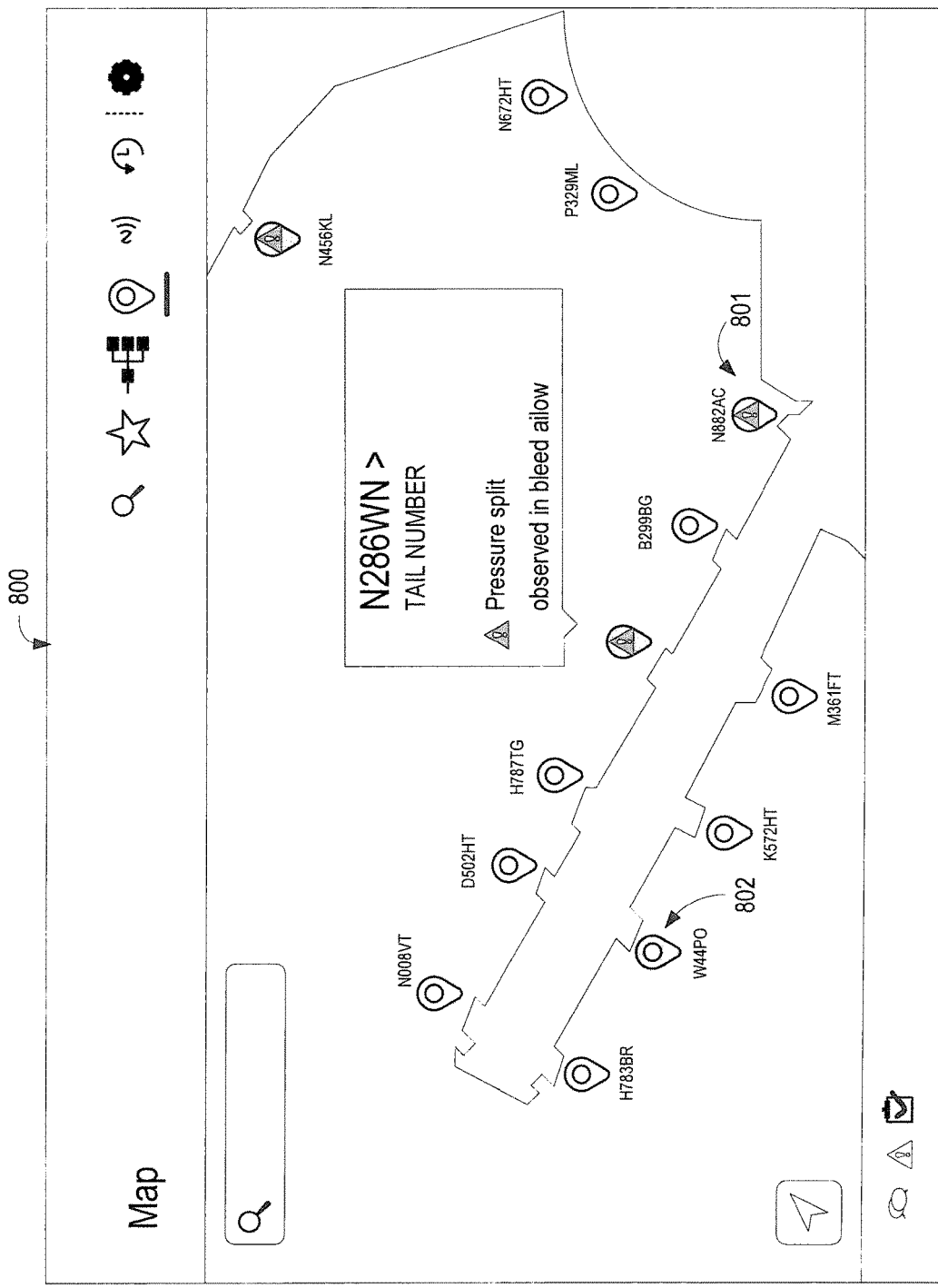
FIG. 8 illustrates an exemplary map of an exemplary machine browser, according to one embodiment.

FIG. 8 illustrates an exemplary map of an exemplary machine browser, according to one embodiment. From the machine browser 500, the gel-location tab 504 is selected, and the map 800 of available machines are displayed. The map 800 has a touch zoom/pan feature. Tapping an icon of a machine spawns a pop-up window displaying detailed information about the selected machine. From the popup window, the user can select as current machine context or open an iOS map for direction or geographical information.

According to one embodiment, the map 800 provides visual indications of machines with their current status, for example, indication of an alert using an alert icon 801. The map also provides visual indication of assigned machines to the logged-in user. For example, pins 802 are shown on the assigned machines to the logged-in user. Tapping the search field allows the user to search for machines and their locations. Tapping a button to center on the current location of the user available machines, NFC, machine history, etc.

According to one embodiment, the machine browser provides a list of machines available via NFC. Those machines that are currently online are highlighted and distinguished from machines that are NFC-capable but are currently offline. According to another embodiment, the machine browser provides a history of machines (or patient) in the chronological order of access, for example, machines accessed today or yesterday.

According to one embodiment, the present cards platform provides a card viewer. The card viewer presents cards in a concise HTML-based application to provide information about and control and configuration of a selected machine (or any other type of assets, system, subsystem, etc.). Cards are the building blocks of the card reader user experience, and can be organized into a collection (in the card organizer) to support a specific workflow and a situational need for a given user.

The card viewer provides a primary view of the card reader application as well as a jumping-off place to navigate to other areas of the user interface. For example, from the machine and patient browser, selecting a machine invokes the card viewer. A swipe up from the bottom of the screen also invokes the card viewer without changing the machine context of the cards. From the card organizer, touching a card invokes the card viewer, as does a swipe down from the top of the screen without changing cards.

According to one embodiment, cards are provided as templates (e.g., HTML, JavaScript, CSS) that are persistent in the card reader. Cards are updated with fresh data when they are loaded. Cards are updated regularly as defined by each card or by the application setting. In one embodiment, updated cards are pushed to the user's device.

According to one embodiment, cards can be viewed in an offline mode when there is no network connectivity. In this case, cached data is presented to the user with a note that the application is offline and that the data being displayed is not fresh. Distribution of the card reader application includes default cards, and users are also able to download new cards through a centralized server, referred to herein as a card center. The card center is accessible through the card organizer as will be discussed in further detail.

In addition to HTML-based cards, some usage situations may require native iOS cards for real-time applications. For example, such situations requiring real-time applications occur in plant control, patient monitoring, or applications requiring substantial client-side analytics. Because iOS does not provide a plug-in architecture, all of the runtime code must be distributed at once, and cards must be baked-in in the distribution package prior to deployment. According to one embodiment, a special version of the card reader application is distributed for applications that contain native card templates and components.

According to one embodiment, the card viewer provides a browser window that links other cards via a link. This allows users to bookmark other cards or web applications presented in the form of a card as if they create bookmarks for web pages and use them in a workflow.

According to one embodiment, each card has associated metadata and settings associated with the metadata. Examples of card metadata include, but are not limited to, name, version, description, favorite flag (e.g., Boolean), rating (e.g., 1-5 stars). According to one embodiment, card settings include user preferences (e.g. the number of items displayed in a list, default filtering), selection of data fields for user-configurable data visualization, and selection of data sources (e.g. server for alerts).

Figure 9:
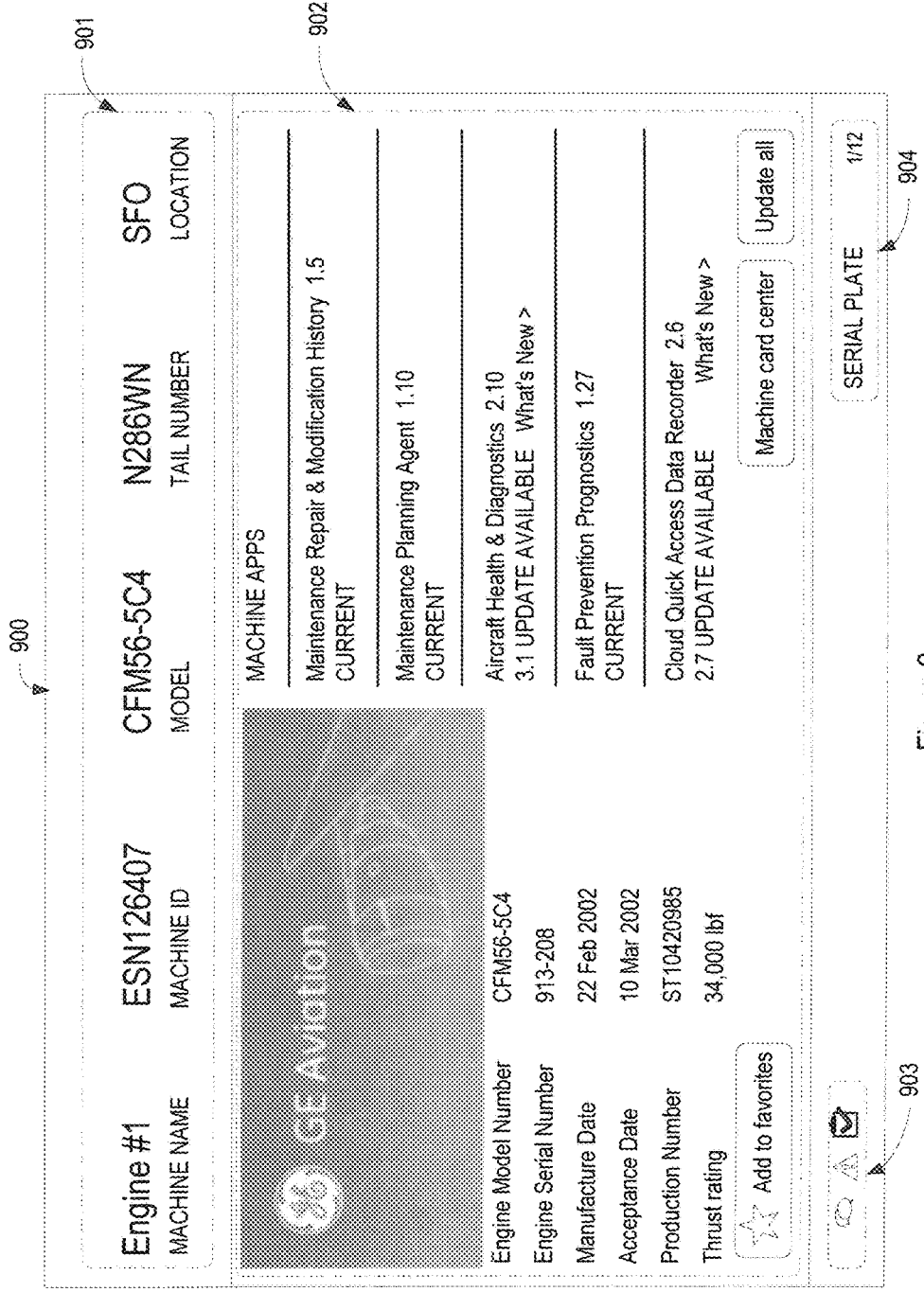
FIG. 9 illustrates an exemplary components of a card viewer, according to one embodiment.

FIG. 9 illustrates an exemplary components of a card viewer, according to one embodiment. The card viewer 900 includes a header 901, card 902, notification icons 903, and a card footer 904. The header 901 provides persistent identification of the selected or in-context machine. The data displayed in the header 901 depends on the type of machine selected as well as user preferences. Machines that are selected in the machine and patient browser are accessible by tapping the header 901 or swiping down from the top of the screen. Different machines display different data in the machine header 901. For example, in a landscape mode, the iPad version of the card reader shows two and five fields that are set by the machine type in the machine graph. Some machines may have few fields to display in the header 901, for example, model and serial number. In a portrait mode, the card reader supports a maximum number of fields (e.g., three fields), and displays up to the maximum number of fields in the machine header.

The card 902 is presented via an HTML, JavaScript, CSS-based mini application that provides information and functionality related to the selected machine. Horizontally swiping the card area navigates sequentially through the cards in the current card collection. The notification icons 903 provide persistent modelers visual feedback about communications, alerts and tasks, as well as navigation to the collaboration and workflow area of the card reader. The card footer 904 displays the card name and its cardinal position in the current collection. Clicking on the card footer 904 launches the card organizer, allowing the user to navigate through cards in the collection or edit, select, add, or delete cards in the current collection.

A card delivers information in the context of a specific machine. This context is displayed in the machine header 901. According to one embodiment, the machine context can be set in one of the three ways, i.e., by the machine browser, by the card itself—a card can be set to be fixed to a specific machine context, and by a link from the collaboration and workflow (e.g. an alert about a specific machine provides a link to set that machine's context).

When the machine context is set, the card reader determines the card to display according to the following logic:
1. display the current card (or the most recently opened) if all of the data required by the card is available and relevant to the selected machine;
2. display the first card in the current collection that is relevant to the selected machine; and
3. display a generic card if no cards are relevant to the selected machine. A generic card template assesses the information that is available about a given machine and displays in a summary form (e.g. name/value pairs).

In addition to showing information and control relevant to the selected machine, a card also portrays hierarchical information and control about parents, children and siblings of the selected machine. For example, when a wind turbine is selected as the machine context, a card shows facts about that turbine and other turbines in the same wind farm (i.e., siblings). Alternately, when a gas turbine is selected as a machine context, a machine may show facts about the power plant (i.e., parent) that the turbine is part of.

According to one embodiment, there are two mechanisms that allow users to navigate between cards, i.e., horizontally swiping to cycle between cards in a collection, and using the card organizer to navigate directly to a card in the selected collection or a different collection. Swiping horizontally on the current card switches to the next card in the selected collection. Swiping should require a sufficiently long drag to reduce accidental navigation, but not such a long drag so as to become ergonomically burdensome. Tapping on a card in the card organizer invokes the card viewer associated with that card.

FIG. 10 illustrates an exemplary alerts card, according to one embodiment. When a human intervention or notification is required, an alert card is presented to the user. In this example, an excessive vibration of a machine is reported with specific information regarding the severity of the vibration issue (e.g., urgent, moderate, notification only), and updates of the alert notification and current status of the machine. The user can type in keywords for searching specific information about the alert.

FIG. 11 illustrates an exemplary serial plate card, according to one embodiment. The machine header shows the machine name, machine ID, model, tail number and the location of the jet engine. On the left of the machine card 1100, the details of a jet engine are shown including model number, serial number, manufacture date, acceptance date, production number, and thrust rating. On the right of the machine card 1100, available machine applications and their update status are shown.

Figure 12:
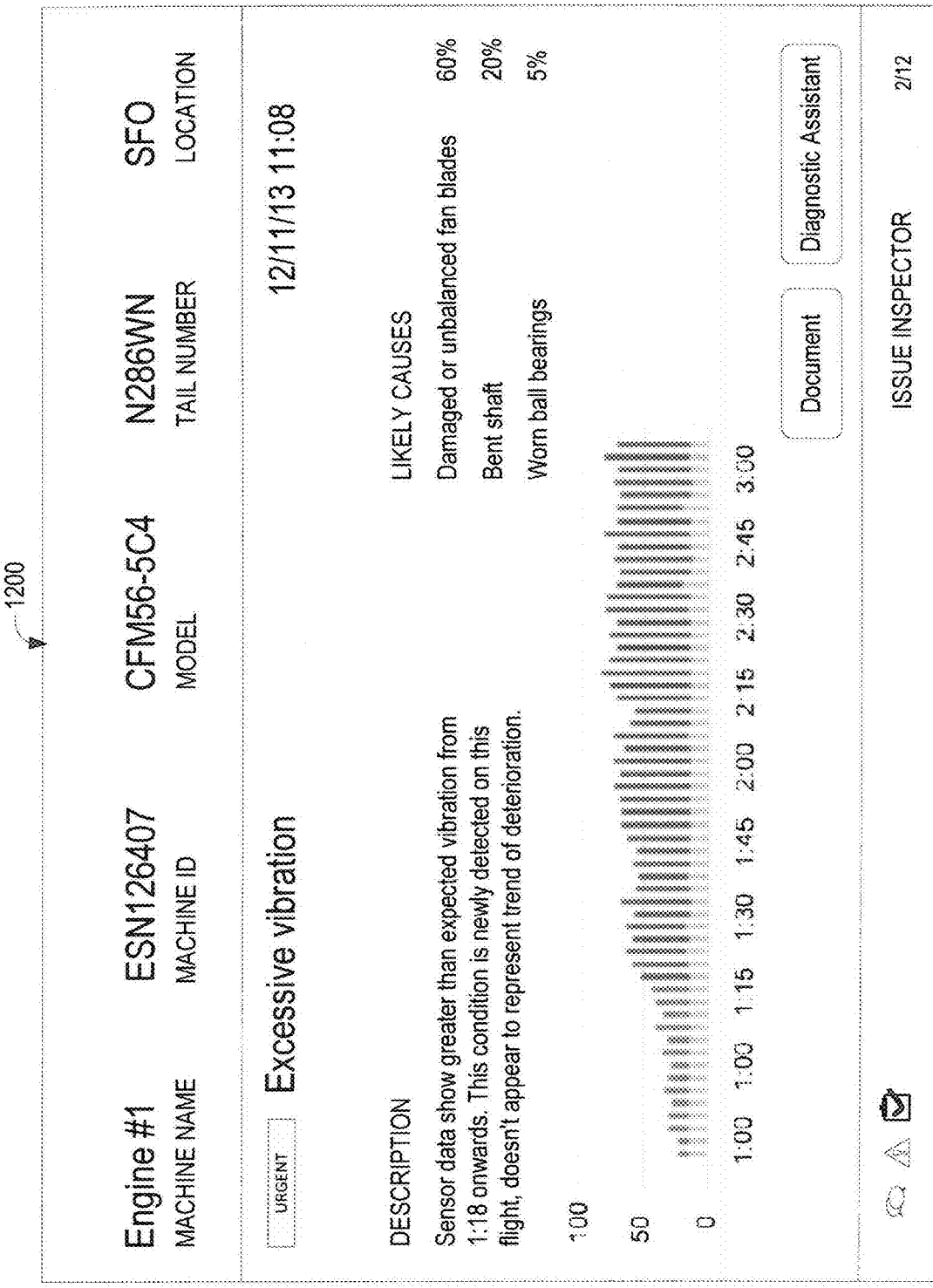
FIG. 12 illustrates an exemplary issue inspector card, according to one embodiment.

FIG. 12 illustrates an exemplary issue inspector card, according to one embodiment. Once an anomaly of the jet engine is detected from sensor data, the prognostics card 1200 indicates the seriousness of the issue (e.g., urgent, moderate). In this example, sensor data of the selected jet engine show excessive vibration but indicates no trend of deterioration. The prognostics card 1200 also shows the likely causes of the issue for the user to further investigate.

Figure 13:
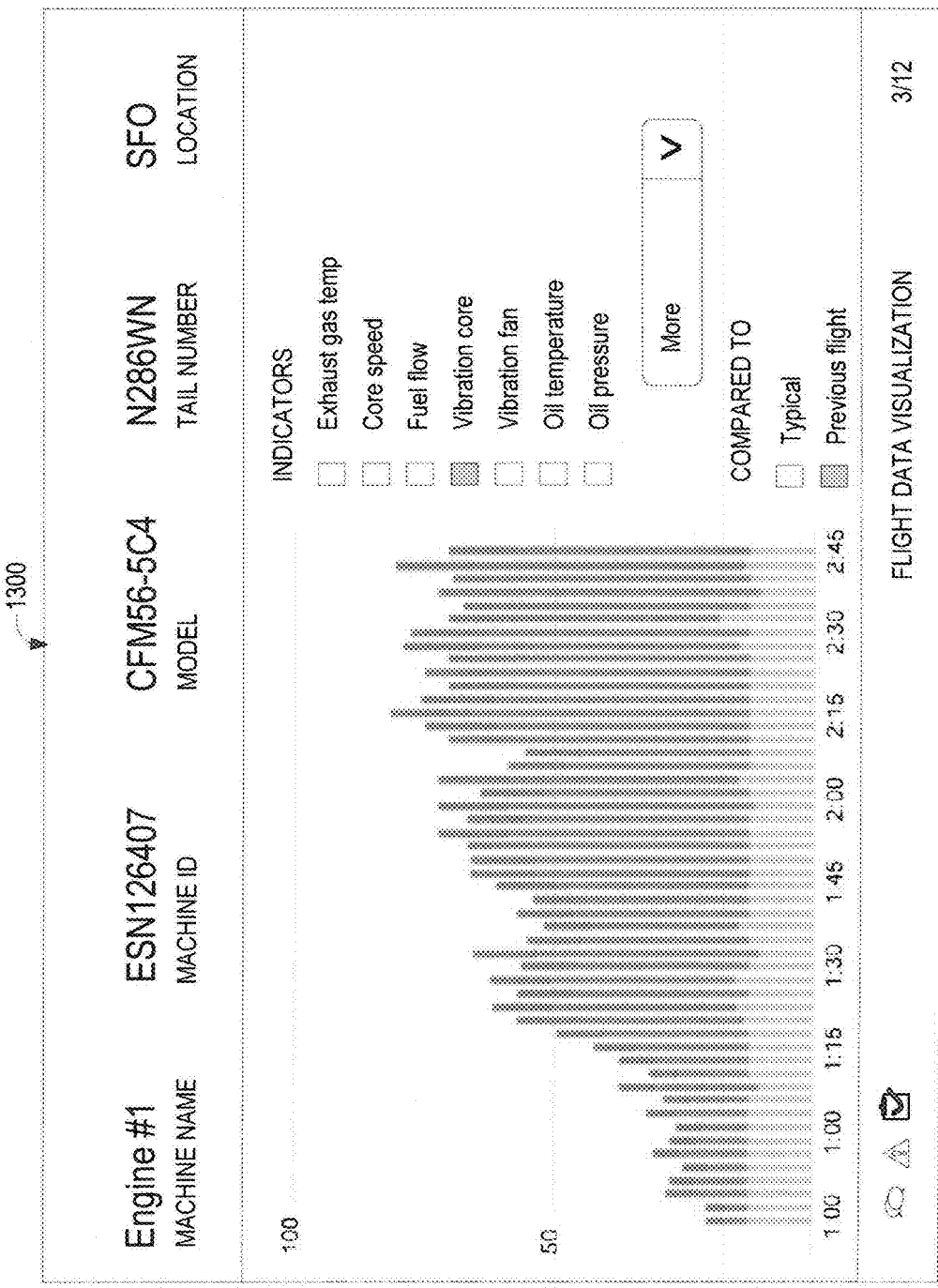
FIG. 13 illustrates an exemplary data visualization card, according to one embodiment.

FIG. 13 illustrates an exemplary data visualization card, according to one embodiment. The diagnostics card 1300 shows the actual sensor data showing the level of vibration of selected jet engine components. In this example, the vibration of vibration core is shown and compared with previous data.

FIG. 14 illustrates an exemplary issue log card, according to one embodiment. The issue log card 1400 shows the details of alert and actions taken on the selected jet engine, including an urgent issue of excessive vibration as shown in FIG. 12 and moderate issue of debris detected in turbofan.

Figure 15:
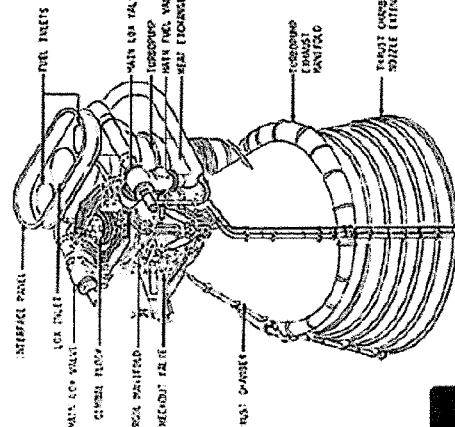
FIG. 15 illustrates an exemplary maintenance manual card, according to one embodiment.

FIG. 15 illustrates an exemplary maintenance manual card, according to one embodiment. The maintenance manual card 1500 is a maintenance step of ignition solenoid assembly and shows the average time to perform the maintenance (e.g., 15 minutes). The diagram shown on the maintenance manual may include a video clip showing the detailed parts and assembly steps.

Figure 16:
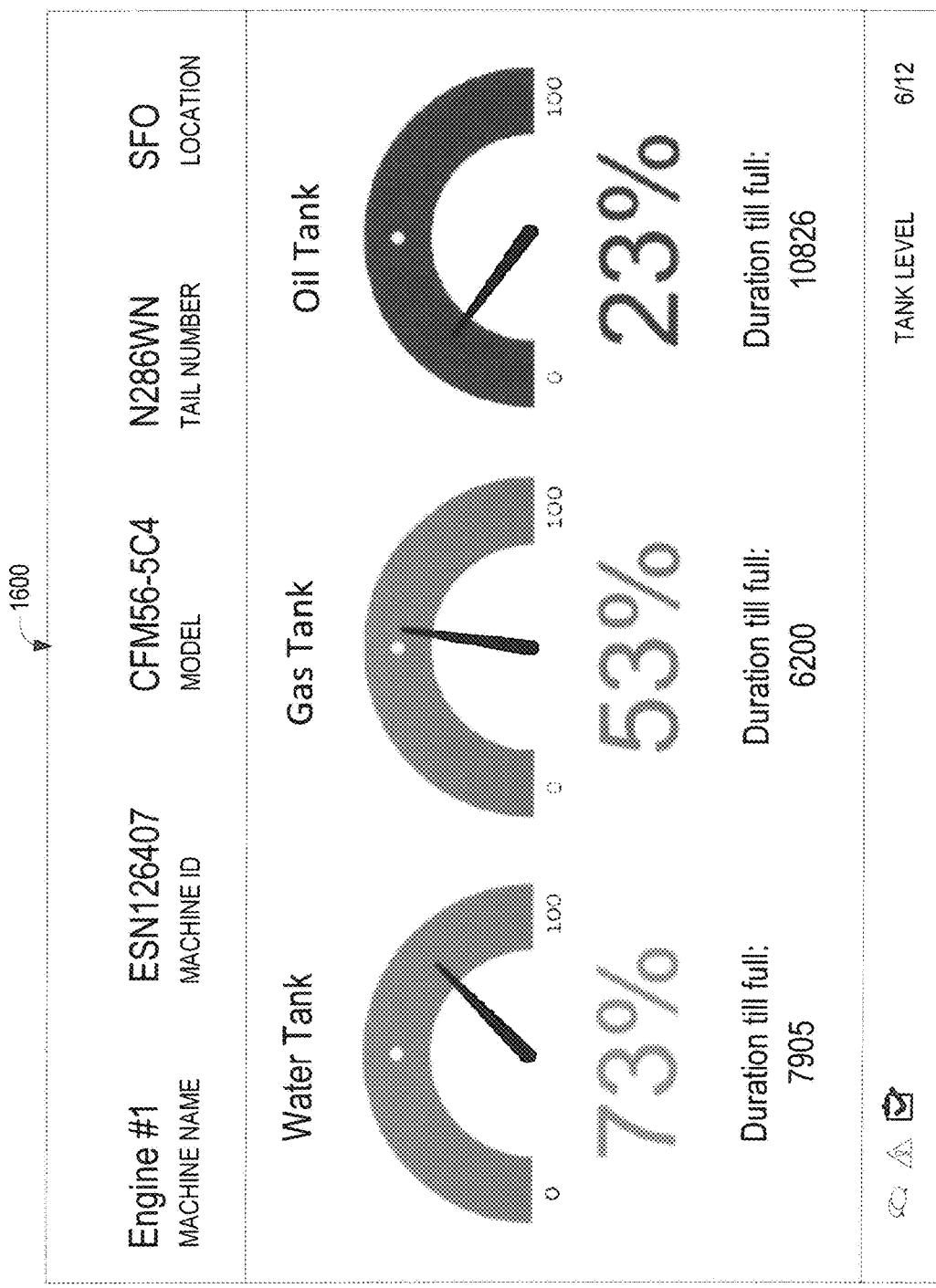
FIG. 16 illustrates an exemplary tank level card, according to one embodiment.

FIG. 16 illustrates an exemplary tank level card, according to one embodiment. The tank level card 1600 shows the level and total capacity of the water tank, gas tank and oil tank of the jet engine.

Figure 17:
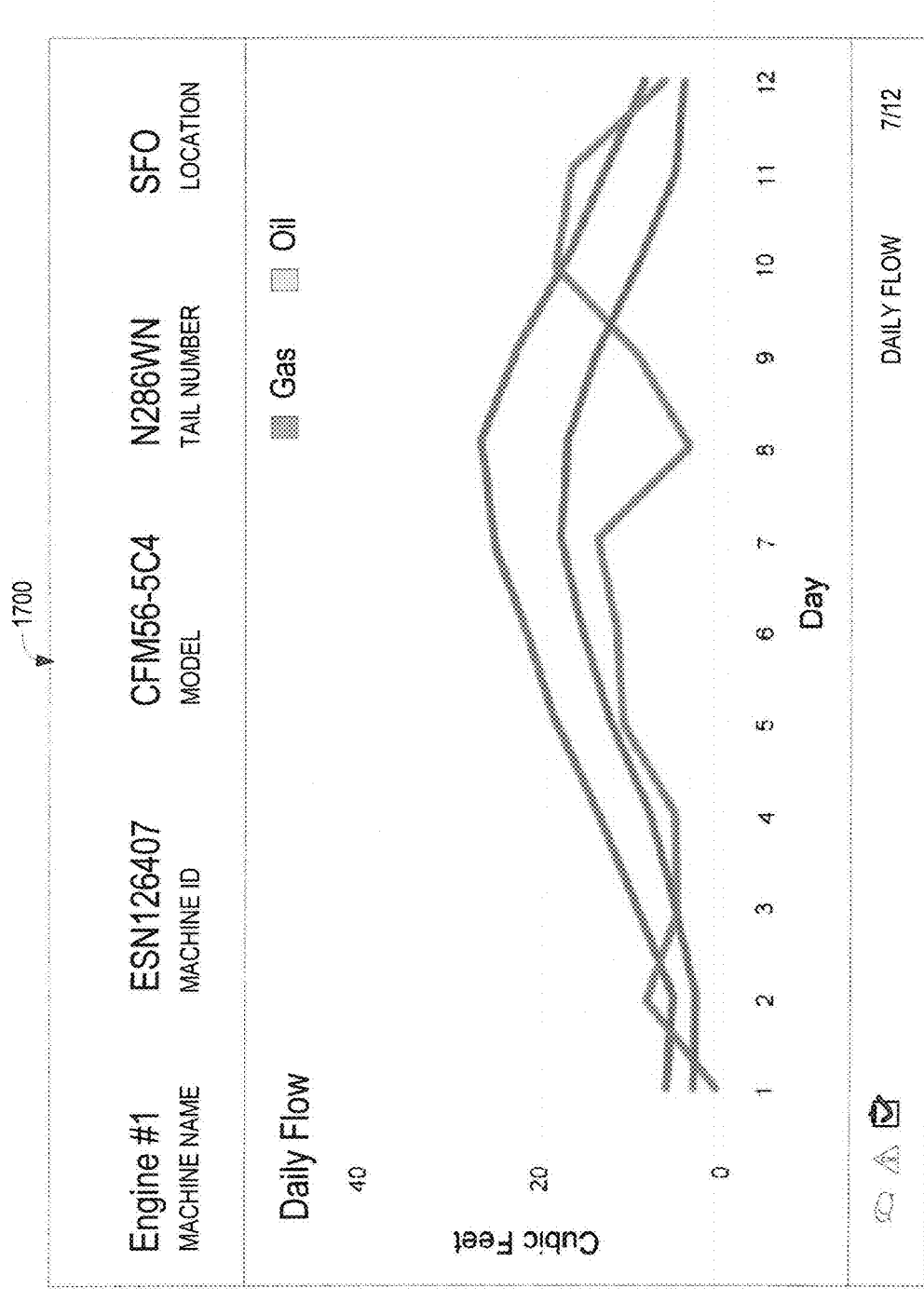
FIG. 17 illustrates an exemplary daily flow card, according to one embodiment.

FIG. 17 illustrates an exemplary daily flow card, according to one embodiment. The daily flow card 1700 illustrates the daily levels of the water tank, gas tank, and oil tank.

Figure 18:
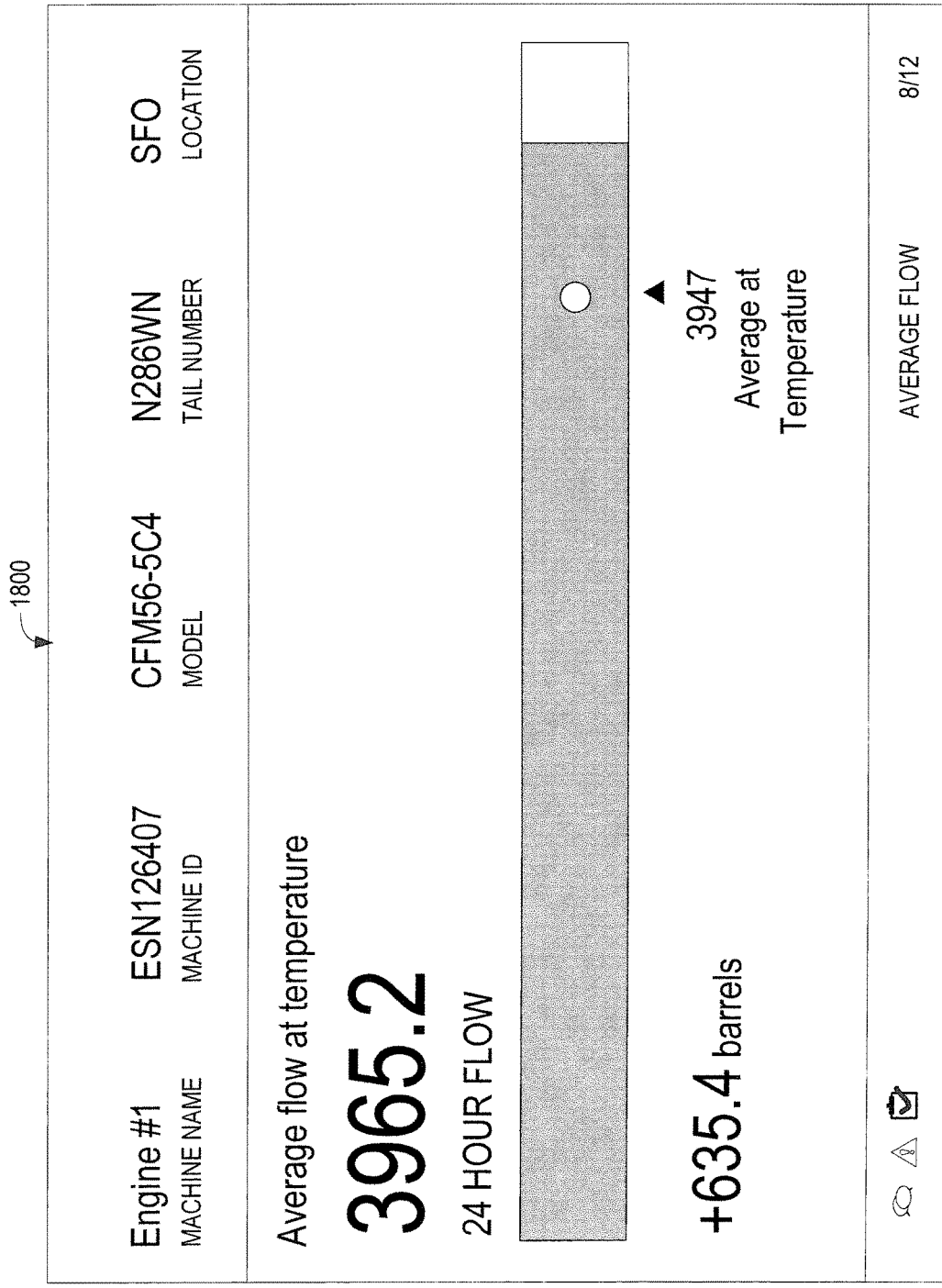
FIG. 18 illustrates an exemplary average flow card, according to one embodiment.

FIG. 18 illustrates an exemplary average flow card, according to one embodiment. The average flow card 1800 shows the 24 hour average flow at temperature.

Figure 19:
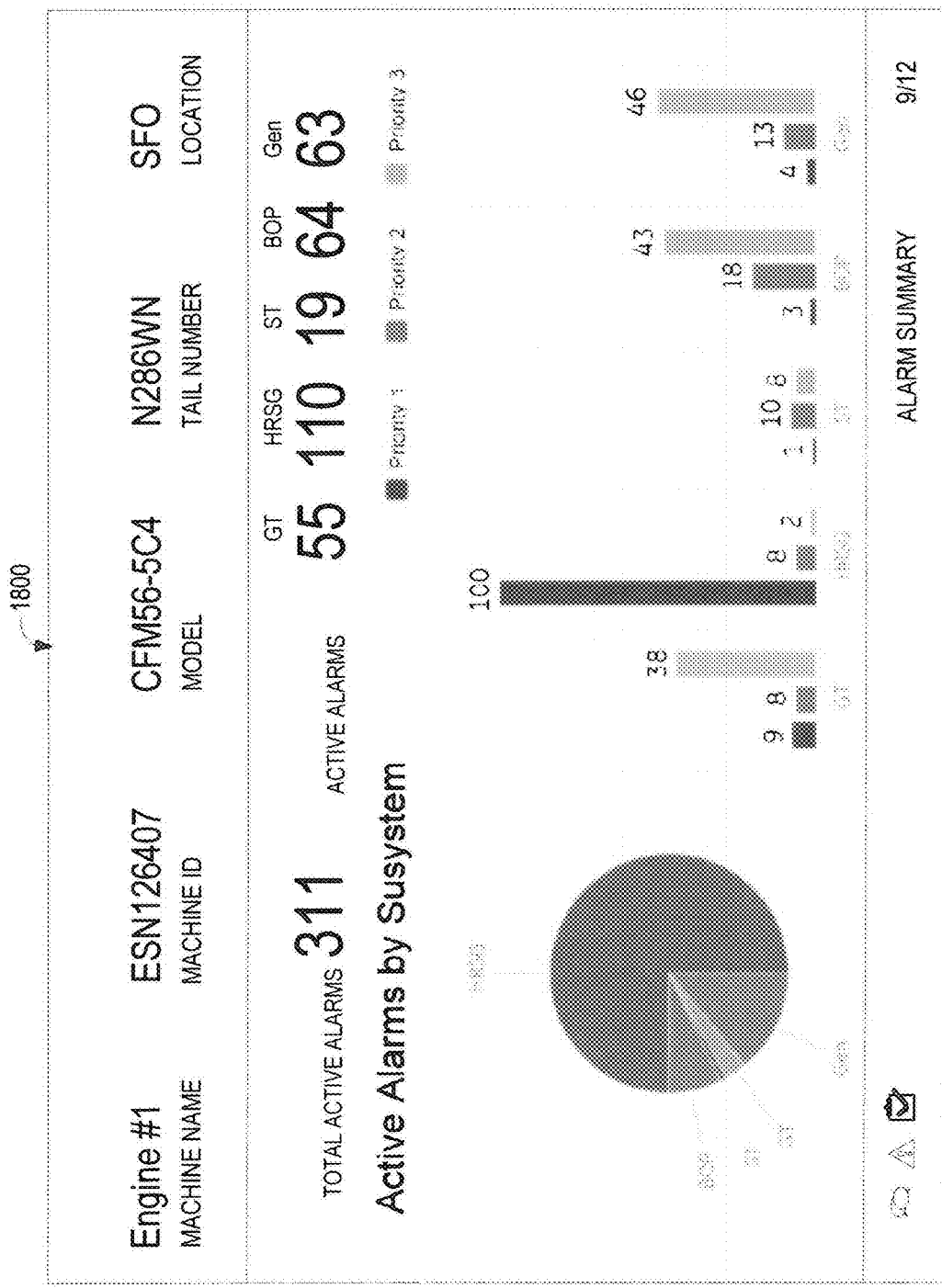
FIG. 19 illustrates an exemplary alarm summary card, according to one embodiment.

FIG. 19 illustrates an exemplary alarm summary card, according to one embodiment. The alarm summary card 1900 shows the statistics of active alarms posted by subsystems (e.g., HRSG, BOP, ST, GT, GEN) of the jet engine and bar charts of active alarms from each subsystem grouped in the order or priority.

FIG. 20 illustrates an exemplary alarm list card, according to one embodiment. The alarm list card 2000 shows the priority, subject, and detailed description of alarms, alarm codes, and the time of alarm posting.

Figure 21:
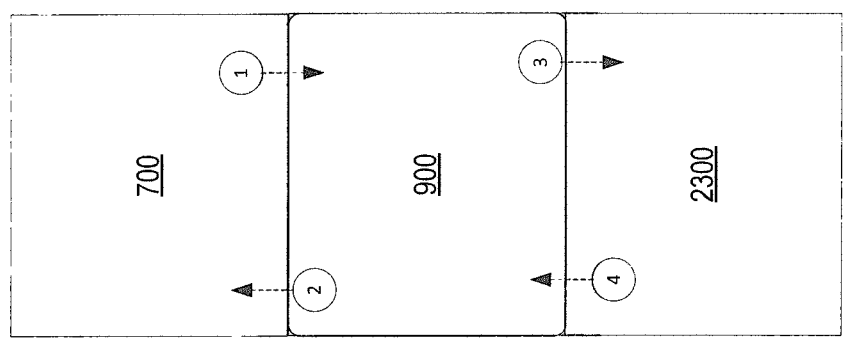
FIG. 21 illustrates an example of vertically stacked user interfaces, according to one embodiment.

In one embodiment, multiple cards are vertically stacked with the appearance of a single continuous background to form a unified sense of space. FIG. 21 illustrates an example of vertically stacked user interfaces, according to one embodiment. The card viewer 900 is shown on the user device while the machine and patient browser 700 and card organizer 2300 are vertically stacked above and below the card viewer 900. The adjacently stacked cards are accessible by animated transitions reinforces relationships and navigation is activated from meaningful touch targets and swipes. For example, touching or swiping the top of the card viewer 900 transitions the user screen to the machine and patient browser 700. Similarly, other user actions can trigger the animated transition between cards that reinforces the spatial relationship between those transitioning cards.

According to one embodiment, navigation between user interfaces is activated by semantically and spatially meaningfully touch and swipe targets. From the machine browser, selecting a machine invokes the card viewer. A swipe up from the bottom of the screen also invokes the card viewer without changing the machine context of the cards. From the card viewer, touching the machine header bar invokes the machine browser as a swipe down from the top of the screen. From the card viewer, touching the card footer area invokes the card organizer, as does a swipe up from the bottom of the screen. From the card organizer, touching a card invokes the card viewer, as does a swipe down from the top of the screen without changing cards.

FIG. 22 illustrates an example of invoking collaboration and workflow coordination from card user interfaces, according to one embodiment. The collaboration and workflow card 2500 sits on a plane behind other card user interfaces (e.g., the machine browser, the card viewer, or the card organizer) and is also persistently available by clicking on a notification icon in the lower right corner of the screen. When a user clicks on the notification icon, the top layer of the user interface slides to the right, revealing the collaboration and workflow 2500, leaving a thin strip 2202 of the user interface that the user has just left. To return to the previous user interface, the user clicks on the thin strip 2202 on the right side.

Figure 23:
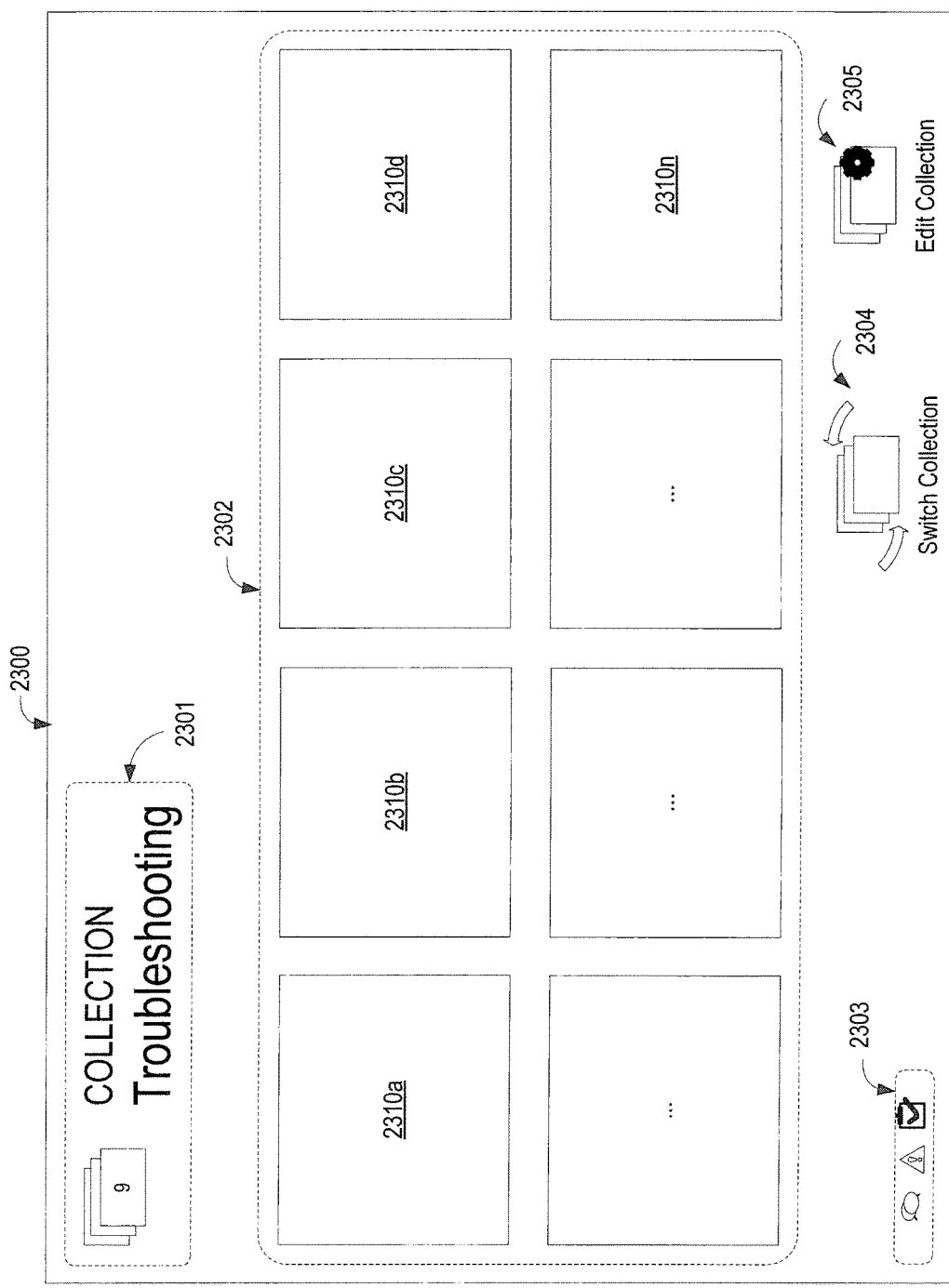
FIG. 23 illustrates an exemplary card organizer, according to one embodiment.

FIG. 23 illustrates an exemplary card organizer, according to one embodiment. The card organizer 2300 provides users with the ability to organize cards 2310 into a collection and download new cards from a card center. The card organizer can be accessed from other user interfaces. For example, from the card viewer, touching the card footer area (e.g., the name of the card) invokes the card organizer, as does a swipe up from the bottom of the screen.

A card collection is the organizing construct for cards as if media files are grouped in a playlists of iTunes or files are grouped in a folder. By grouping together cards that are used together in a common situation, the cognitive memory and motor work for users are reduced such that users do not have to remember where to get the information and data, and navigate through different software to perform their jobs. Cards that are adjacent to each other in the collection can be easily navigated to with a swipe gesture in the card organizer 2300.

In addition to manually created collections, the present card organizer 2300 supports subscribed collections that allow a user to download a whole collection of cards. The whole collection of cards can be updated en masse when the publisher makes changes. This allows publishers to control not only the content of cards but also the combination of cards for an application. According to one embodiment, the present card organizer 2300 supports smart collections of cards to present suggested cards based on rules and algorithms that determine cards that may be useful in a given situation.

The card organizer 2300 shows collection name 2301 (e.g., troubleshooting) with the number (e.g., 9) superimposed in the collection icon indicates the number of cards in the collection. The card organizer 2300 also shows snapshot of available cards 2302 in a collection. The order is left-to-right, and wrapping at the end of the row. Because of the swipe interaction in the card viewer, accurate presentation of the cardinal order is important. Notification icons 2303 indicate new communications, alerts and tasks and provide navigation to collaboration and workflow. Switch collection 2304 brings the user to the all collections view. Edit collection 2305 invokes collection editing mode.

Figure 24:
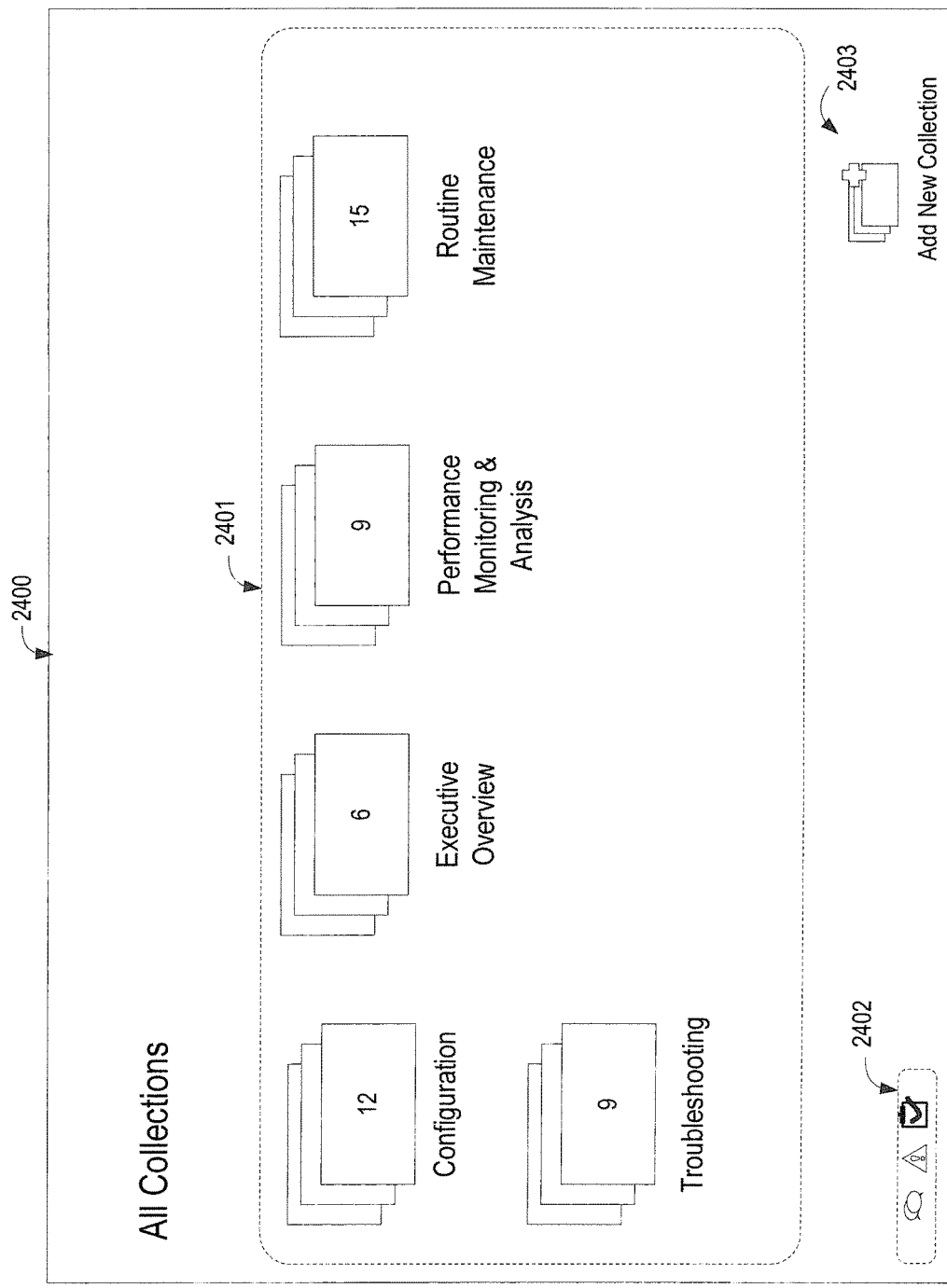
FIG. 24 illustrates a screenshot of exemplary collections, according to one embodiment.

FIG. 24 illustrates a screenshot of exemplary collections, according to one embodiment. Each icon of all collections 2401 represents a collection, the number represents the number of available cards in the collection. Clicking the icon invokes the collection. Notification icons 2402 indicate new communications, alerts and tasks and provide navigation to collaboration and workflow. Clicking "add new collection" 2403 invokes a new collection modal dialog. Collaboration and workflow contain a set of capabilities that allow users to communicate with each other, including text chat, voice and video calling, and image/card sharing, as well as tasks and alerting.

FIG. 25 illustrates a screenshot of an exemplary collaboration and workflow user interface, according to one embodiment. A list of colleagues collaborating in a project is shown in the main user interface of the collaboration and workflow. By clicking on an individual on the colleagues list, a text message, alerts, notifications from the individual can be accessed as if the user checks text or voice messages on his/her phone. The collaboration and workflow user interface also identifies individuals who are responsible for or have expertise in a particular issue. The user can contact an individual or a group of individuals in a video call to discuss collaborately on the issue. The collaboration and workflow user interface allows users to share and suggest cards to transfer expert knowledge, or share images and annotations on an image with each other. In one embodiment, a user can share an image or a card by a gestural input (e.g., swiping in a space) to move the image of the user's device to a big screen in a group meeting.

Figure 26:
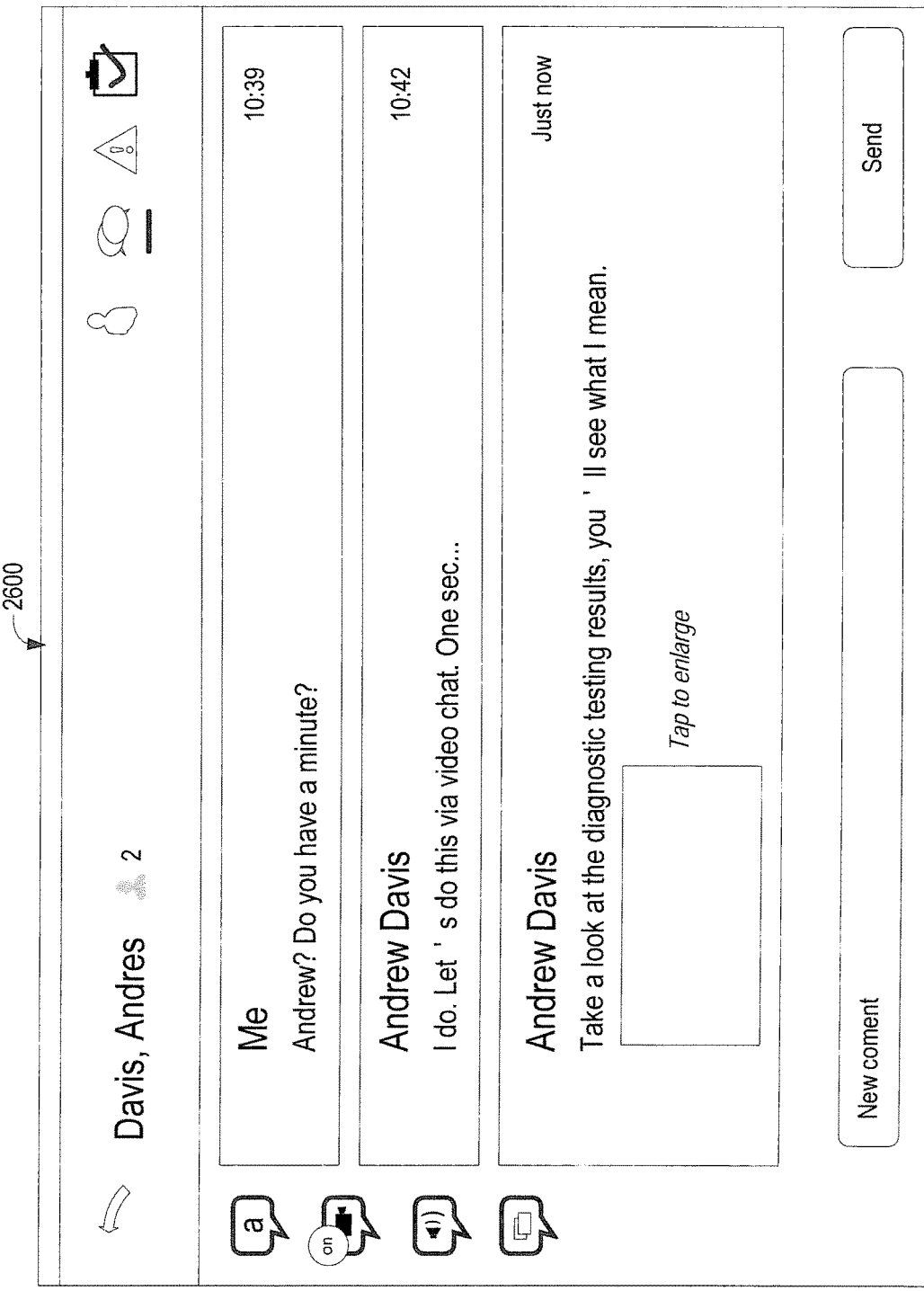
FIG. 26 illustrates a screenshot of another exemplary collaboration and workflow user interface, according to one embodiment.

FIG. 26 illustrates a screenshot of another exemplary collaboration and workflow user interface, according to one embodiment. A user starts a live chat with other users and shares a diagnostics card. A thumbnail of the card is shown in the chat window, and the user can click on the thumbnail to enlarge and import the card along with data.

Card Archetypes—Industrial

Figure 27:
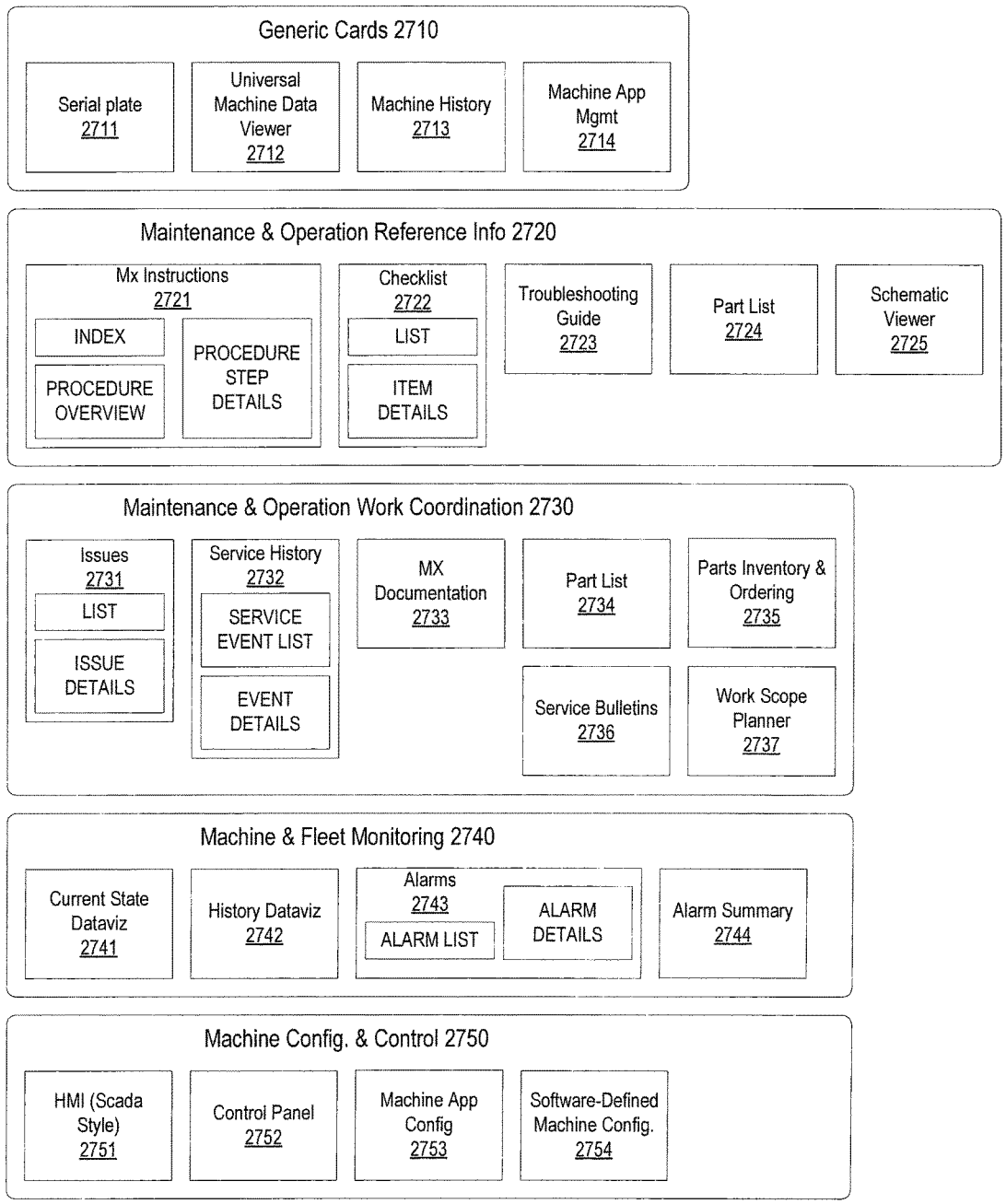
FIG. 27 illustrates exemplary card archetypes for industrial applications, according to one embodiment.

FIG. 27 illustrates exemplary card archetypes for industrial applications, according to one embodiment. The industrial card archetypes reflect common patterns of cards across machine types and card implementations. Each of these archetypes may have quite a number of different implementations based upon the specifics of the machine, the available information, and also business and workflow needs of an enterprise and customer who are deploying and using the cards. The card archetypes for industrial applications include generic cards 2710, maintenance and operation reference info 2720, maintenance and operation work coordination 2730, machine and fleet monitoring 2740, and machine configuration and control 2750.

Generic cards 2710 include a serial plate 2711, universal machine data viewer 2712, machine history 2713, and machine app management 2714. Generic cards 2710 provide a common set of views of machine information, and work across machine types. In some cases, a card is provided for a specific machine type or model (e.g. for all gas turbines). Generic cards 2710 represent views of data on almost any machine without requiring a user to download a card for each machine. Serial plate 2711 provides basic information about the machine, including serial number, manufacture date and location, operational capacity, ratings and limits. Different information is available and appropriate for different machines. The diversity is accommodated either through a card template that adapts to the data type the machine offers, or through machine-specific card templates. Universal machine data viewer 2712 contains a type of cards that are capable of adaptively reflecting whatever data a machine makes available to the card reader. The data is initially presented as name/value pairs, and users have the ability to view the current state and history in a graph or in a table. Machine history 2713 provides a unified view of the history of the selected machine, in a manner similar to a wall of a social media website. Machine history cards include data also reflected in other cards including issues, maintenance logs, service bulletins, etc. Machine app management 2714 is a type of cards that provide the ability to manage machine applications, or encapsulations of software running on the controller of a machine.

Maintenance and operation reference information 2710 contains a type of cards that provide information about maintenance procedures, machine parts, assembly and wiring, or the like. The information on the maintenance and operation reference information cards is typically relevant to all machines of a given model and not unique to an individual machine. This information typically changes relatively infrequently, and users may want to cache on their device to support maintenance scenarios in places and situations with limited network connectivity (e.g., hospital basements, turbine decks in power plants, wind farms, drilling sites).

Cards under maintenance instructions 2721 provide step-by-step guides to performing maintenance and repair procedures for machines. The instructions may be text-based or include diagrams and/or video content. Checklist 2722 allows individuals and groups to track the execution of operational procedures (e.g. starting up a power plant). Individual steps may be linked to other cards (e.g. maintenance instructions 2721). Troubleshooting guide 2723 walks a user through a decision tree to identify a root cause of an issue. Troubleshooting guide 2723 may also be linked to other cards, for example, maintenance instructions 2721, schematic viewer 2725, and alarms 2743.

Cards under part list 2724 provide a list of component subsystems, subassemblies and parts that make up a given machine. Some part list may provide visual navigation of a machine to allow a user to quickly identify a part based on its location on a machine. In one embodiment, part list cards employ image recognition algorithms for automatic parts identification. Part list cards are also linked to parts inventory and ordering 2735. Schematic viewer 2725 allows a user to view assembly, wiring and logic diagrams for the selected machine. In one embodiment, schematic viewer 2725 provides a visual navigation mechanism to help users locate the correct schematic/diagram.

The cards under maintenance and operation work coordination 2730 provide capabilities related to how maintenance is conducted on a selected machine. The design of the maintenance and operation work coordination cards is consistent across machine types/models within a given implementation, therefore these cards are similar across businesses, although there may be some diversity with respect to maintenance and operation procedures and existing systems. The data on these cards must be kept current but the cards themselves may not require real-time updates.

An issue 2731 indicates a problem or situation that must be resolved. These may be human-instantiated (e.g. a pilot report for an issue with an aircraft) or system-generated (e.g. an analytic that identifies a deteriorating trend). Issues must be resolved and are always assigned to one or more persons whose role is to resolve the identified issues. The persons are notified about new issues that require their attention through alerts (in workflow and collaboration), and the work to resolve the issue is reflected in each assigned user's tasks (in workflow and collaboration). Issues are intended to provide a relatively high-signal, low-noise, as opposed to alarms as identified in SCADA/HMI that are system-generated and tend to be relatively noisy, thus requiring substantial user filtering to identify actions to be acted upon.

Service history 2732 provides a historical list of all maintenance logs that have been performed on a given machine. The maintenance logs are useful in troubleshooting and work planning scenarios.

Maintenance documentation 2733 provides capabilities to document and record maintenance procedures for recordkeeping. Maintenance documentation 2733 may provide both structured and free-form inputs, though biased towards structured input to improve info quality for machine learning. Parts inventory and ordering 2735 provides visibility into the availability of parts, and ordering process. Parts that are available for ordering are identified through a part list card 2734. Service bulletins 2736 provide a historical list of any recalls, changes to maintenance and operation procedures for a given machine. Work scope planner 2737 provides tools to define a work scope and get approval if necessary.

Machine and fleet monitoring 2740 contains a type of cards that provide information about the current state and historical operation of a specific machine, a plant, campus or fleet. These cards require fresh data (or feedback when fresh data is not available), but depending on the machine and usage situation, data that is seconds or minutes old may be acceptable. These cards generally do not require a real-time application.

Current state dataviz 2741 provides visual, textual, and numerical representation of the current functioning of a machine. Examples such a state include temperature, pressure, vibration, and speed. History dataviz 2742 provides visual, textual, numerical representation of the functioning of a machine (or plant or fleet) over a period of time. Examples of functioning of a machine over a period of time includes temperature, pressure, vibration, and speed.

Alarms 2743 provide a filterable list of system-generated alarms (e.g. from a SCADA/HMI) that are triggered when certain conditions are met. The alarm summary 2744 provides a high-level overview of alarms on a plant or large machine, broken down by components (e.g. a mixed-cycle power plant broken by gas turbine, steam turbine, generator, etc.) The alarm summary 2744 helps operators and maintenance personnel determine where their attention is required, and provides a visual drill-down into the alarm list 2743.

Machine configuration and control 2750 contains a type of cards that provide the capability to change settings and actuate mechanical control of a machine (e.g. turn a pump on). Control is typically providing in context of visual and numerical feedback of associated data (e.g. the speed of fluid leaving the pump). Configuration changes may not require hard real time, whereas control generally does require hard real time, for both the control signal and the data feedback.

Human-machine interface (HMI) 2751 provides capabilities similar to the SCADA/HMI in a power plant or manufacturing environment and visual representation of the plant/line/component machine with visual and numerical representation of current sensor data (e.g. temperature, pressure gauges, etc.), along with mechanisms (e.g. buttons, dials, faders) to actuate control of the machine (e.g. stop a pump).

Control Panel 2752 provides the ability to change settings for the machine. Machine app configuration 2753 provides the ability to changes settings for the machine applications (control software running on a machine controller). Software-defined machine configuration 2754 provides the ability to create or modify a software-defined machine, a virtualization approach to controller logic.

Figure 28:
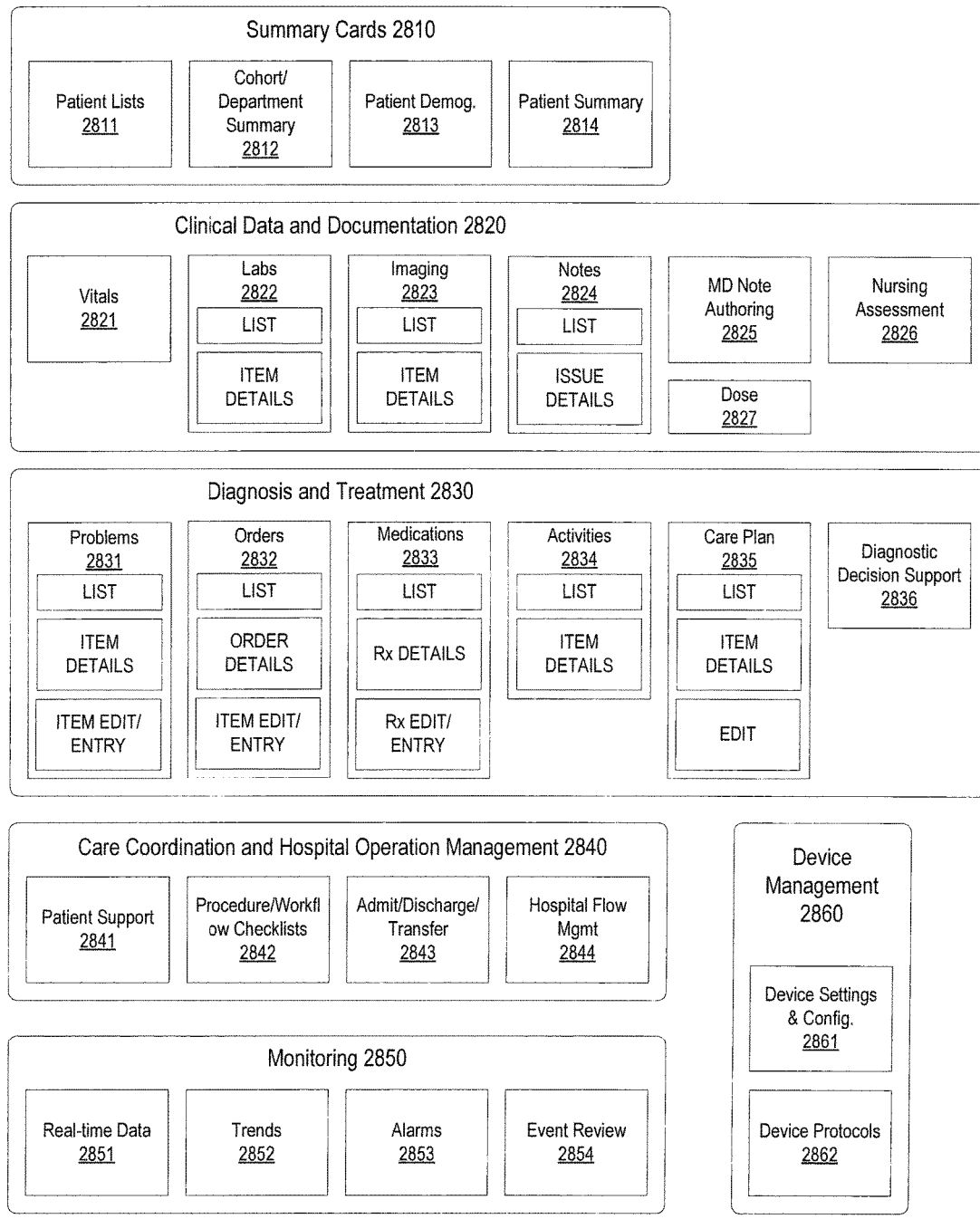
FIG. 28 illustrates exemplary card archetypes for healthcare applications, according to one embodiment.

FIG. 28 illustrates exemplary card archetypes for healthcare applications, according to one embodiment. These healthcare card archetypes reflect common patterns of cards across machine types and card implementations by a healthcare business. Each of these archetypes may have quite a number of different implementations based upon the specifics of the machine, the available information, and also business and workflow needs of an enterprise and customer who are deploying and using the cards. The card archetypes for healthcare applications include summary cards 2810, clinical data and documentation 2820, diagnostics and treatment planning 2830, care coordination and hospital operation management 2840, monitoring 2850, and device management 2860. The summary cards 2810 provide a high level overview of a healthcare system including patient lists 2811, cohort/department summary 2812, patient demographics 2813, patient summary 2814 such as medical condition (e.g. problems) and critical information like allergies and medications. The clinical data and documentation 2820 include data such as vitals 2812, labs 2822, imaging 2823, notes 2824, MD note authoring 2825 (e.g., physician documentation such as progress notes, admission, discharge and transfer notes, and procedure notes), nursing assessments 2826, and dose 2827. The diagnostics and treatment planning 2830 provides analytic and algorithmic-based approaches to diagnosing patient health problems, and creating a standards based plan of care. The examples of the diagnostic and treatment planning cards 2830 include problems 2831, orders 2832, medications 2833, activities 2834, care plan 2835, diagnostic decision support 2836. The care coordination and hospital operation management 2840 provides coordination of people and equipment to support hospital operations such as patient support 2841, procedure and workflow checklists 2842, admittance/discharge/transfer 2843, and hospital flow management 2844. The monitoring 2850 provides diagnostic data such as waveform and numeric data from sensors on patients such as ECG machines and perinatal monitors and includes real-time data 2851, trends 2852, alarms 2853, and event review 2854. The device management 2860 provides device settings and configuration 2861 and device protocols 2862.

Figure 29:
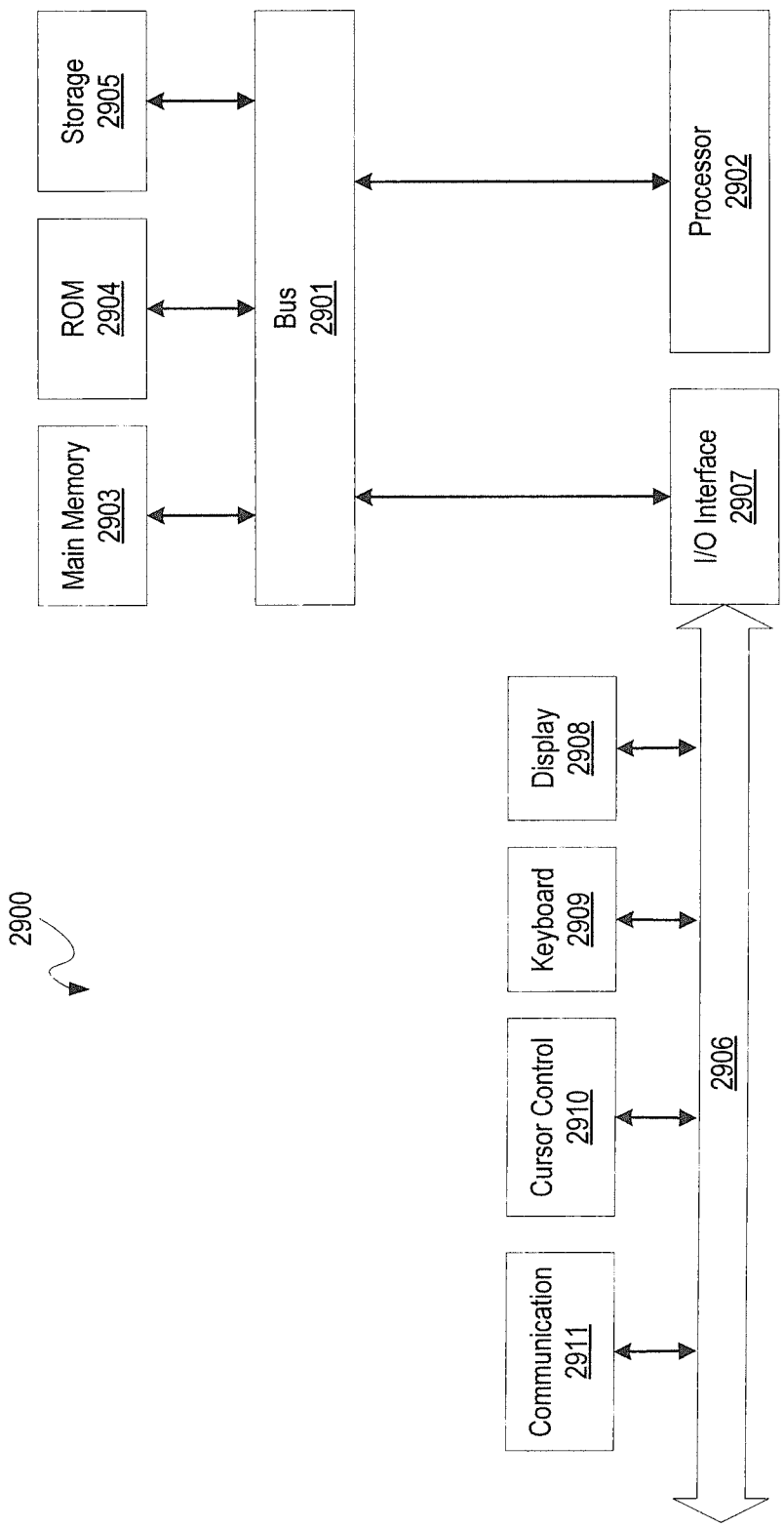
FIG. 29 illustrates an exemplary computer architecture that may be used for the present system, according to one embodiment.

FIG. 29 illustrates an exemplary computer architecture that may be used for the present system, according to one embodiment. The exemplary computer architecture may be used for implementing one or more components described in the present disclosure including, but not limited to, the present system. One embodiment of architecture 2900 includes a system bus 2901 for communicating information, and a processor 2902 coupled to bus 2901 for processing information. Architecture 2900 further includes a random access memory (RAM) or other dynamic storage device 2903 (referred to herein as main memory), coupled to bus 2901 for storing information and instructions to be executed by processor 2902. Main memory 2903 also may be used for storing temporary variables or other intermediate information during execution of instructions by processor 2902. Architecture 2900 may also include a read only memory (ROM) and/or other static storage device 2904 coupled to bus 2901 for storing static information and instructions used by processor 2902.

A data storage device 2905 such as a magnetic disk or optical disc and its corresponding drive may also be coupled to architecture 2900 for storing information and instructions. Architecture 2900 can also be coupled to a second I/O bus 2906 via an I/O interface 2907. A plurality of I/O devices may be coupled to I/O bus 2906, including a display device 2908, an input device (e.g., an alphanumeric input device 2909 and/or a cursor control device 2910).

The communication device 2911 allows for access to other computers (e.g., servers or clients) via a network. The communication device 2911 may include one or more modems, network interface cards, wireless network interfaces or other interface devices, such as those used for coupling to Ethernet, token ring, or other types of networks.

The above example embodiments have been described hereinabove to illustrate various embodiments of implementing a system and method for providing context-based user experiences. This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A computer-implemented method comprising:
   determining a context of a user;
   causing a list of available card collections to be displayed on a device of the user, the list of available card collections being determined based on the determined context of the user;
   receiving a first user selection of one of the available card collections via the device;
   causing a plurality of user interface cards corresponding to the selected one of the available card collections to be displayed on the device;
   receiving a second user selection of at least one of the plurality of user interface cards via the device;
   saving the selected at least one of the plurality of user interface cards to the device, each one of the selected at least one of the plurality of user interface cards having a corresponding data portion and corresponding form portion, each corresponding form portion being persisted on the device;
   receiving a first identification of a first machine, the first machine being distinct from and external to the device of the user;
   determining that one of the saved at least one of the plurality of user interface cards is relevant to the first machine based on a determination that the one of the saved at least one of the plurality of user interface cards matches a first selected context defined by first header data stored on the device, the first header data indicating at least one preference of the user;
   causing the one of the saved plurality of user interface cards to be loaded for display on the device based on the determination that the one of the saved at least one of the plurality of user interface cards is relevant to the first machine, the loading of the at least one of the saved plurality of user interface cards comprising updating the corresponding data portion of the at least one of the saved plurality of user interface cards with fresh data from an enterprise server that is distinct from the device of the user;

receiving a second identification of a second machine, the second machine being distinct from and external to the device of the user;

determining that there are no user interface cards in the saved at least one of the plurality of user interface cards that are relevant to the second machine based on a determination that none of the user interface cards in the saved at least one of the plurality of user interface cards matches a second selected context defined by second header data stored on the device, the second header data indicating at least one preference of the user; and causing a summary user interface card to be displayed on the device based on the determination that there are no user interface cards in the saved at least one of the plurality of user interface cards that are relevant to the second machine, the causing the summary user interface card to be displayed on the device comprising retrieving information about the second machine and causing the retrieved information about the second machine to be displayed within the summary user interface card as name-value pairs.

2. The computer-implemented method of claim 1, wherein the user's context comprises the user's location, role, responsibility, situation, and environment.

3. The computer-implemented method of claim 1, wherein the machine and patient browser comprises user interface cards for favorites, a hierarchy browser, map-based asset identification, and near field communication (NFC).

4. The computer-implemented method of claim 1, wherein the plurality of user interface cards comprises a card viewer and a card organizer.

5. The computer-implemented method of claim 1, wherein the plurality of user interface cards provides a collaboration and workflow coordination tool for a plurality of users.

6. The computer-implemented method of claim 1, wherein the plurality of user interface cards is provided based on a spatial interaction model.

7. The computer-implemented method of claim 1, wherein the plurality of user interface cards is provided based on an expert or group suggestion.

8. The computer-implemented method of claim 1, wherein the user's device is one of the device group comprising a smartphone, a mobile device, a laptop, a big screen, a desktop PC, a wearable computer, and an industrial machine.

9. The computer-implemented method of claim 1, wherein at least one of the saved plurality of user interface cards is configured to enable the user to interact with and control an industrial machine that is distinct from the device and the enterprise server.

10. A system comprising:
a network interface of a device for connecting to a server;
a display of the device for providing user interface cards to a user; and
a processor of the device running a card reader configured to:
cause a list of available card collections to be displayed on the device, the list of available card collections being determined based on a determined context of the user;
receive a first user selection of one of the available card collections via the device;
cause a plurality of user interface cards corresponding to the selected one of the available card collections to be displayed on the device;
receive a second user selection of at least one of the plurality of user interface cards via the device;
save the selected at least one of the plurality of user interface cards to the device, each one of the selected at least one of the plurality of user interface cards having a corresponding data portion and corresponding form portion, each corresponding form portion being persisted on the device;
receive a first identification of a first machine, the first machine being distinct from and external to the device of the user;
determine that one of the saved at least one of the plurality of user interface cards is relevant to the first machine based on a determination that the one of the saved at least one of the plurality of user interface cards matches a first selected context defined by first header data stored on the device, the first header data indicating at least one preference of the user;
cause the one of the saved plurality of user interface cards to be loaded for display on the device based on the determination that the one of the saved at least one of the plurality of user interface cards is relevant to the first machine, the loading of the at least one of the saved plurality of user interface cards comprising updating the corresponding data portion of the at least one of the saved plurality of user interface cards with fresh data from an enterprise server that is distinct from the device of the user;
receive a second identification of a second machine, the second machine being distinct from and external to the device of the user;
determine that there are no user interface cards in the saved at least one of the plurality of user interface cards that are relevant to the second machine based on a determination that none of the user interface cards in the saved at least one of the plurality of user interface cards matches a second selected context defined by second header data stored on the device, the second header data indicating at least one preference of the user; and
cause a summary user interface card to be displayed on the device based on the determination that there are no user interface cards in the saved at least one of the plurality of user interface cards that are relevant to the second machine, the causing the summary user interface card to be displayed on the device comprising retrieving information about the second machine and causing the retrieved information about the second machine to be displayed within the summary user interface card as name-value pairs.

11. The system of claim 10, wherein the user's context comprises the user's location, role, responsibility, situation, and environment.

12. The system of claim 10, wherein the machine and patient browser comprises user interface cards for favorites, a hierarchy browser, map-based asset identification, and near field communication (NFC).

13. The system of claim 10, wherein the plurality of user interface cards comprises a card viewer and a card organizer.

14. The system of claim 10, wherein the plurality of user interface cards provides a collaboration and workflow coordination tool for a plurality of users.

15. The system of claim 10, wherein the plurality of user interface cards is provided based on a spatial interaction model.

16. The system of claim 10, wherein the plurality of user interface cards is provided based on an expert or group suggestion.

17. The system of claim 10, wherein the system is selected from a group comprising a smartphone, a mobile device, a laptop, a big screen, a desktop PC, a wearable computer, and an industrial machine.

18. The system of claim 10, wherein at least one of the saved plurality of user interface cards is configured to enable the user to interact with and control an industrial machine that is distinct from the device and the enterprise server.

* * * * *